United States Patent
Brown et al.

(10) Patent No.: US 11,837,225 B1
(45) Date of Patent: *Dec. 5, 2023

(54) MULTI-PORTION SPOKEN COMMAND FRAMEWORK

(71) Applicant: Amazon Technologies, Inc., Seattle, WA (US)

(72) Inventors: Chase Brown, Boston, MA (US); Christopher Wheeler, Cambridge, MA (US); Kevin Bedell, Manchester, MA (US)

(73) Assignee: Amazon Technologies, Inc., Seattle, WA (US)

(*) Notice: Subject to any disclaimer, the term of this patent is extended or adjusted under 35 U.S.C. 154(b) by 208 days.

This patent is subject to a terminal disclaimer.

(21) Appl. No.: 17/164,149

(22) Filed: Feb. 1, 2021

Related U.S. Application Data

(63) Continuation of application No. 15/466,271, filed on Mar. 22, 2017, now abandoned.
(Continued)

(51) Int. Cl.
*G10L 15/22* (2006.01)
*G10L 15/18* (2013.01)
(Continued)

(52) U.S. Cl.
CPC .............. *G10L 15/22* (2013.01); *G10L 13/08* (2013.01); *G10L 15/063* (2013.01); *G10L 15/1815* (2013.01); *G10L 2015/223* (2013.01)

(58) Field of Classification Search
CPC ....... G10L 15/22; G10L 15/063; G10L 13/08; G10L 15/1815; G10L 2015/223;
(Continued)

(56) References Cited

U.S. PATENT DOCUMENTS 9,691,384 B1 * 6/2017 Wang ........................ G10L 15/18
9,704,488 B2 * 7/2017 Kashtan .................. G10L 17/04
(Continued)

*Primary Examiner* — Abdelali Serrou
(74) *Attorney, Agent, or Firm* — PIERCE ATWOOD LLP

(57) ABSTRACT

A framework for efficiently importing content into a speech-controlled system in a manner that makes the content easily accessible using voice commands. A speech-controlled system that can be controlled using a variety of commands, including a command to retrieve audio content, can be configured using a framework of content organization that allows new content to be ingested using the framework, thus making the new content accessible to users of the system without manually adjusting the system to recognize when incoming commands call for the new content. The framework can include configured content demarcations (such as information demarcations that divide content into articles, or other sized portions), labels for those demarcations (such as topic descriptors or the like), etc. Various language processing components such as intent classification and named entity recognition can be configured to recognize words that relate to the new content such as recognizing intents to access the new content using the topic descriptors or other labels. In this manner data related to new content may be more efficiently incorporated into a speech processing system.

20 Claims, 23 Drawing Sheets

Related U.S. Application Data

(60) Provisional application No. 62/435,154, filed on Dec. 16, 2016.

(51) Int. Cl.
*G10L 13/08* (2013.01)
*G10L 15/06* (2013.01)

(58) Field of Classification Search
CPC ... G10L 2015/088; G10L 13/00; G10L 15/26; G10L 15/30; G10L 25/78; G10L 13/02; G10L 13/033; G10L 13/04; G10L 15/00; G10L 15/005; G10L 15/08; G10L 15/18; G10L 15/1822; G10L 15/24; G10L 15/265; G10L 15/28; G10L 17/22; G10L 2015/221; G10L 2015/227; G10L 2021/02082; G10L 21/02; G10L 21/06
See application file for complete search history.

(56) References Cited

U.S. PATENT DOCUMENTS

| | | | |
|---|---|---|---|
| 9,894,312 B2* | 2/2018 | Pontual | G06F 3/0488 |
| 10,409,550 B2* | 9/2019 | Malatesha | G06F 3/041 |
| 2010/0274667 A1* | 10/2010 | Lanham | G10L 15/26 |
| | | | 707/E17.103 |
| 2012/0072219 A1* | 3/2012 | Johnston | G10L 15/22 |
| | | | 704/E15.005 |
| 2014/0180697 A1* | 6/2014 | Torok | G06F 16/61 |
| | | | 704/275 |
| 2015/0039307 A1* | 2/2015 | Jeon | G10L 15/22 |
| | | | 704/235 |
| 2015/0348551 A1* | 12/2015 | Gruber | G10L 15/1822 |
| | | | 704/235 |
| 2016/0098992 A1* | 4/2016 | Renard | G10L 15/30 |
| | | | 704/275 |
| 2016/0259779 A1* | 9/2016 | Labský | G06F 40/35 |
| 2017/0083285 A1* | 3/2017 | Meyers | G10L 15/00 |
| 2017/0116982 A1* | 4/2017 | Gelfenbeyn | G10L 15/08 |

* cited by examiner

FIG. 8

| Content Source | Topic | Content Text Data |
|---|---|---|
| Content source X | Topic X-1 | Content text data X-1 |
| Content source X | Topic X-2 | Content text data X-2 |
| Content source X | Topic X-3 | Content text data X-2 |
| Content source X | Topic X-4 | Content text data X-3 |
| Content source Y | Topic Y-1 | Content text data Y-4 |
| Content source Y | Topic Y-6 | Content text data Y-5 |

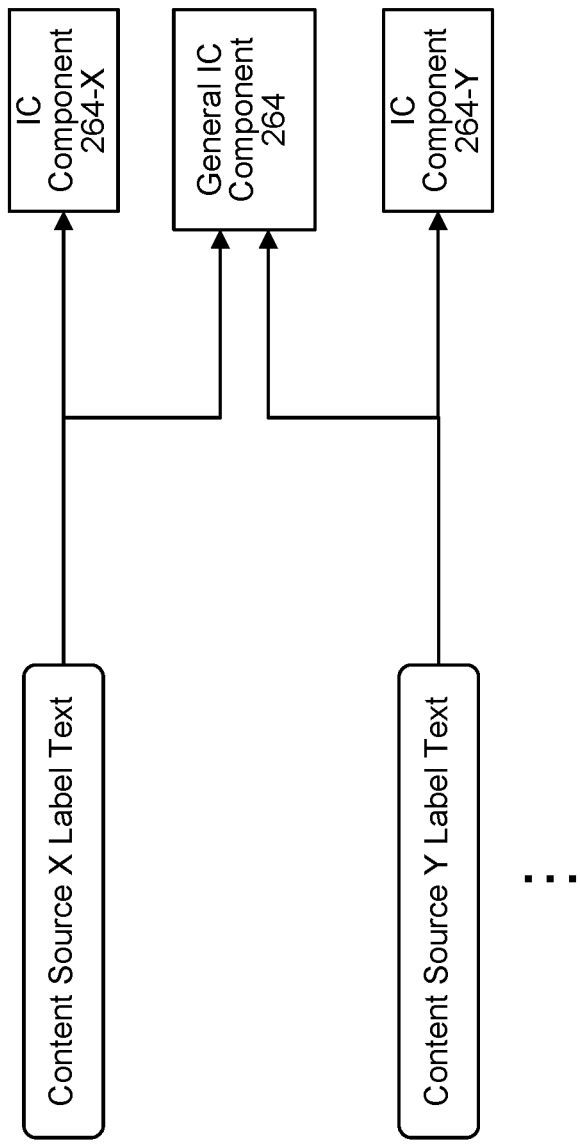

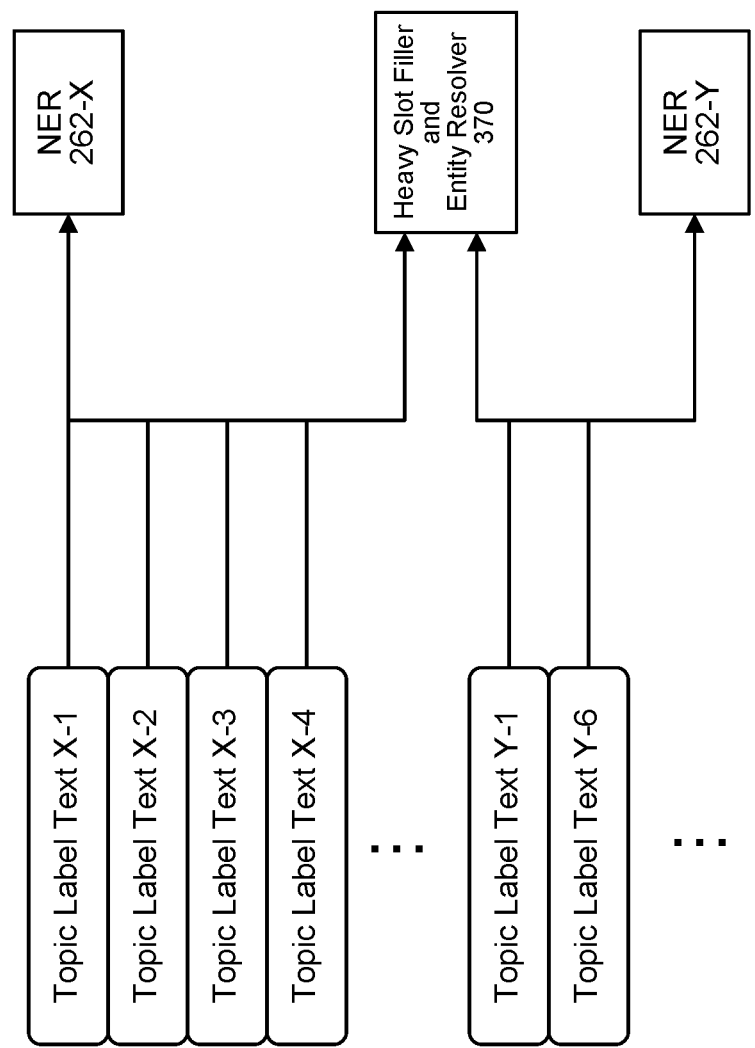

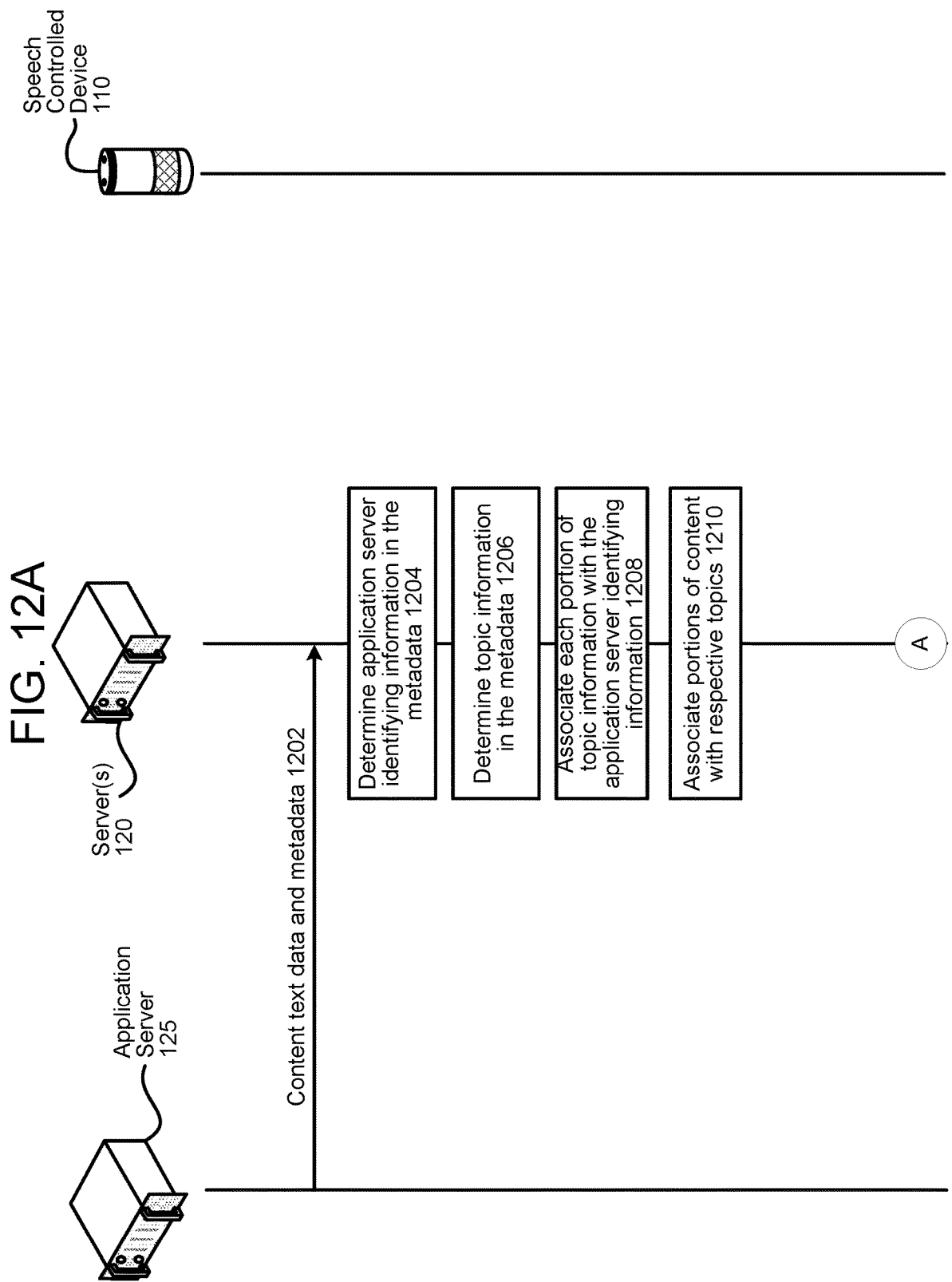

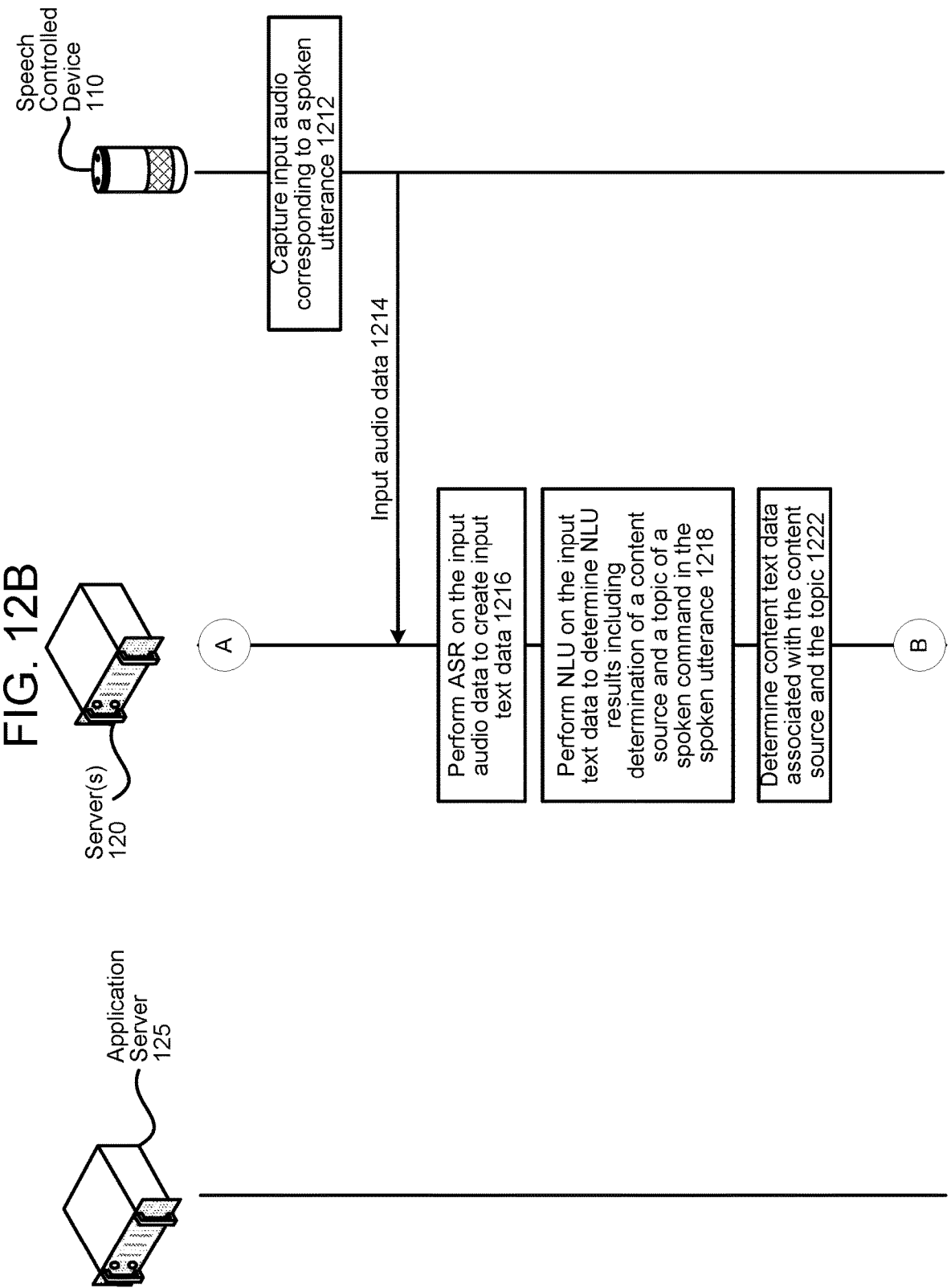

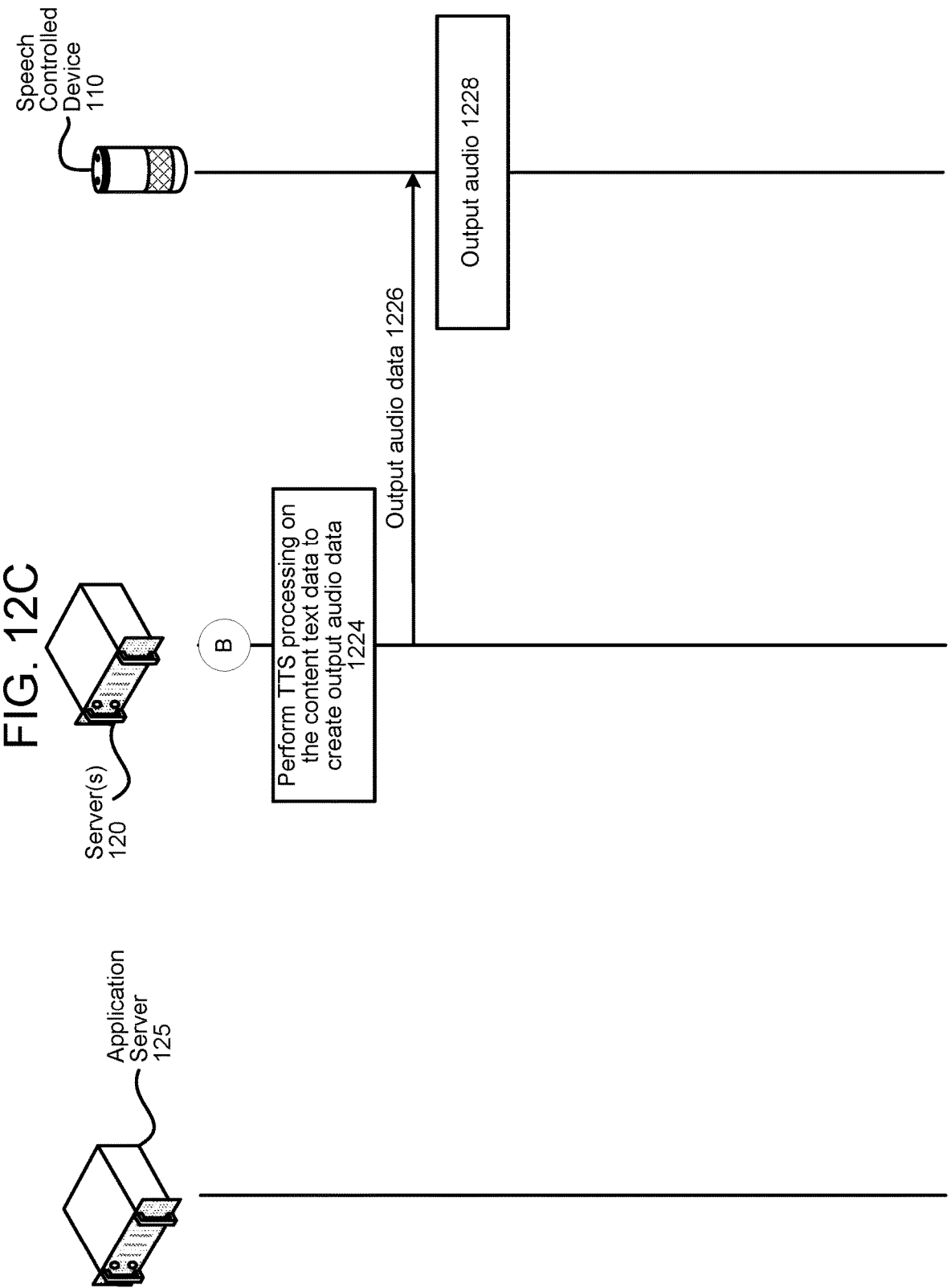

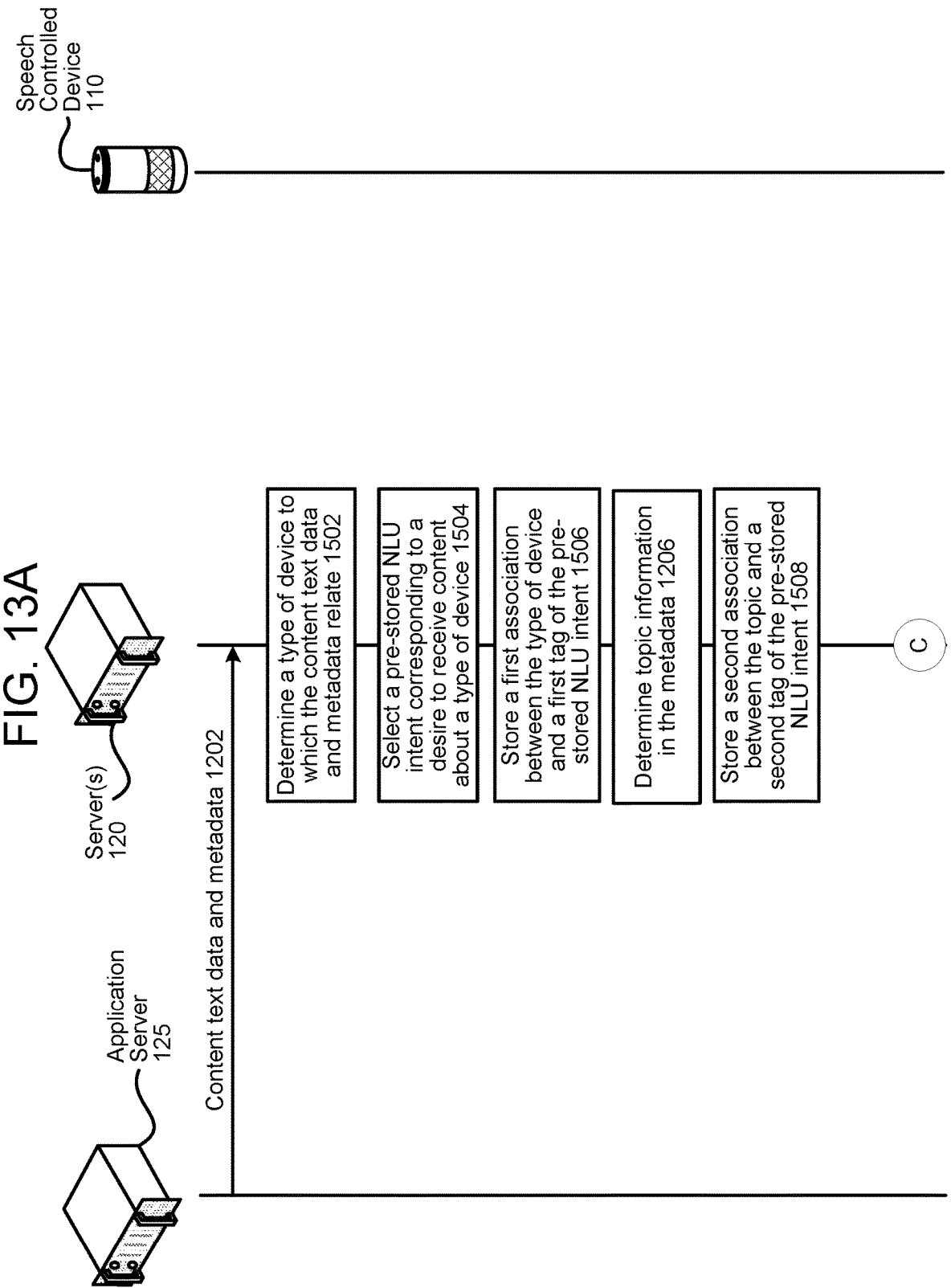

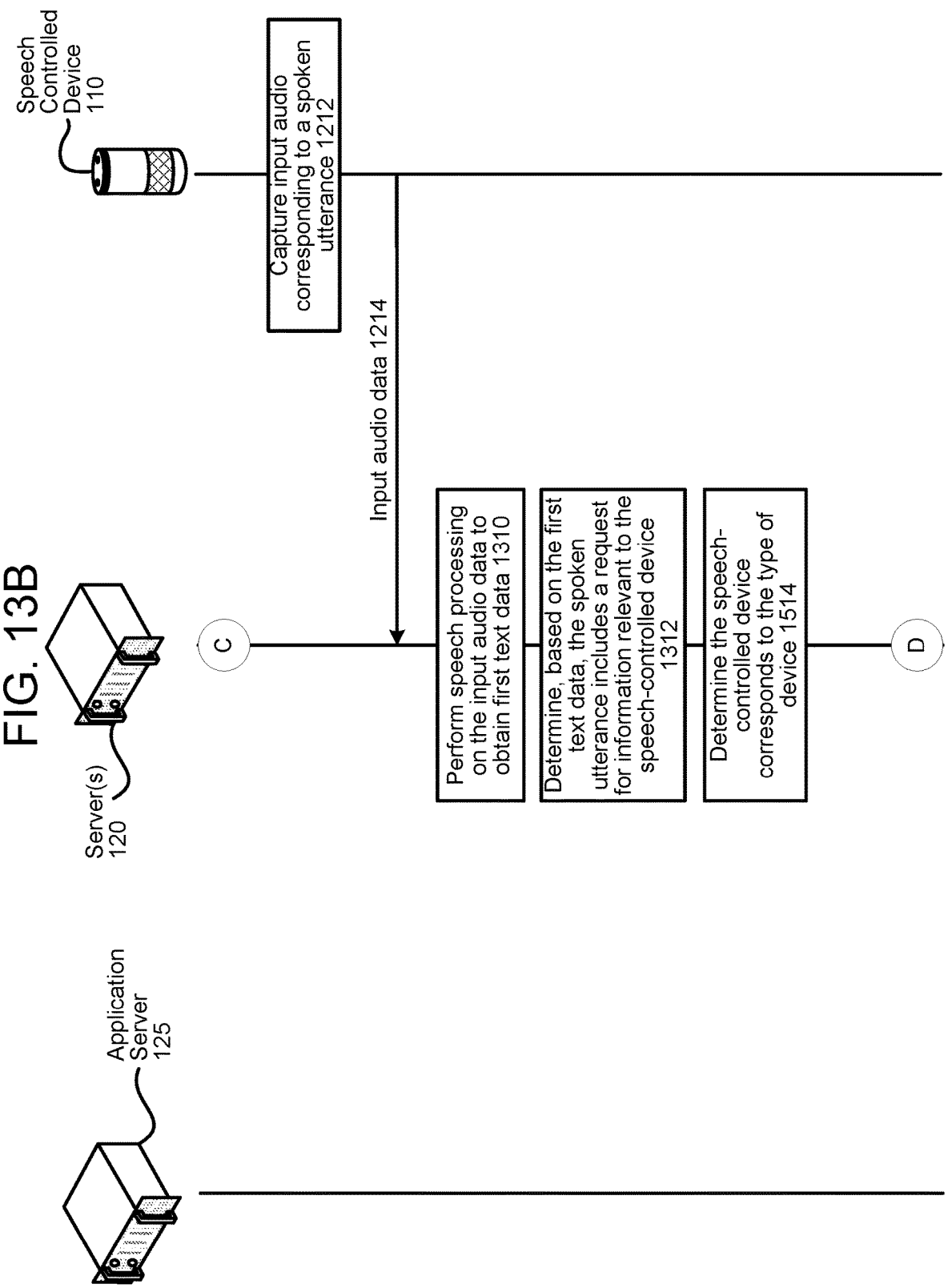

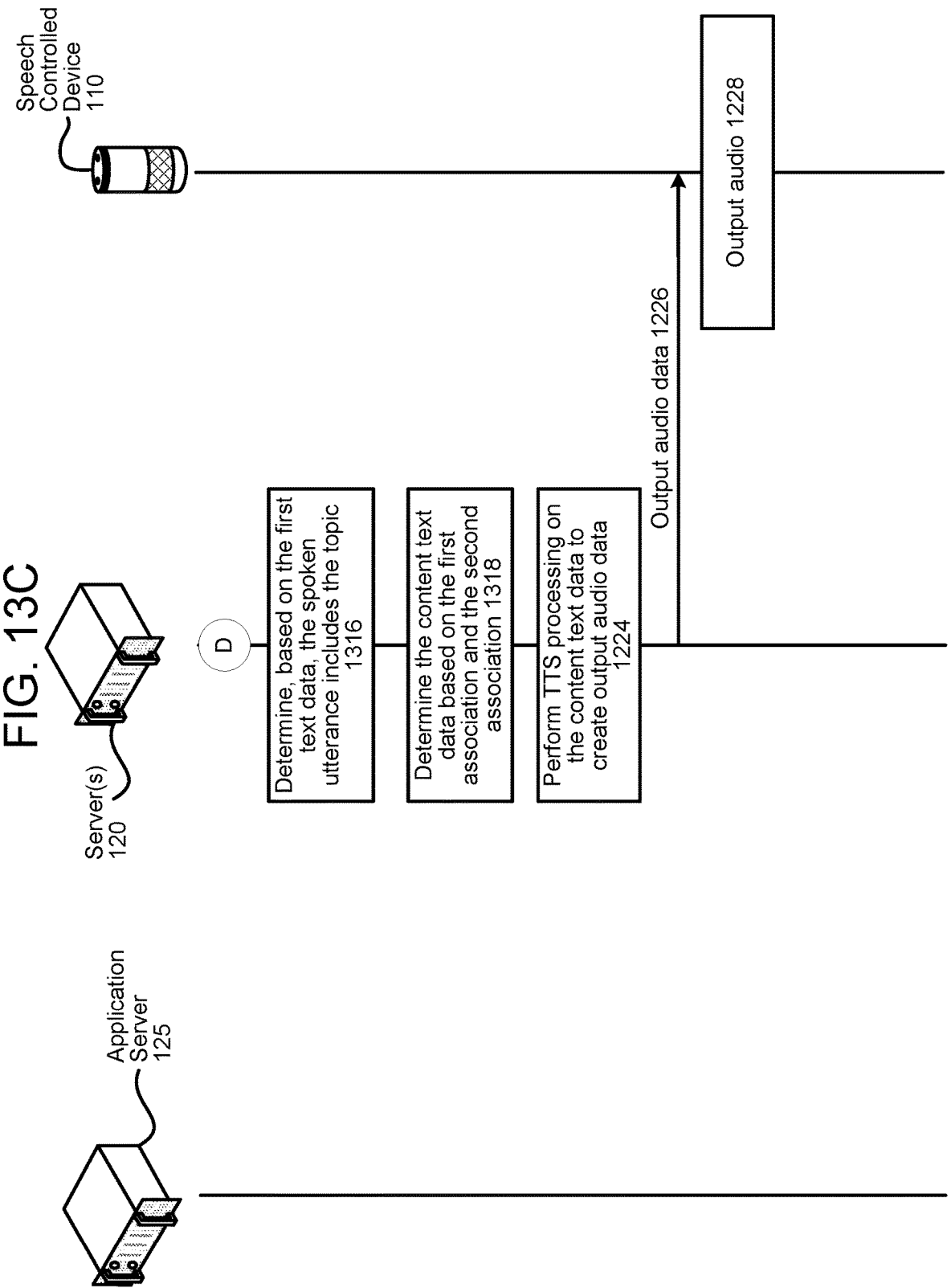

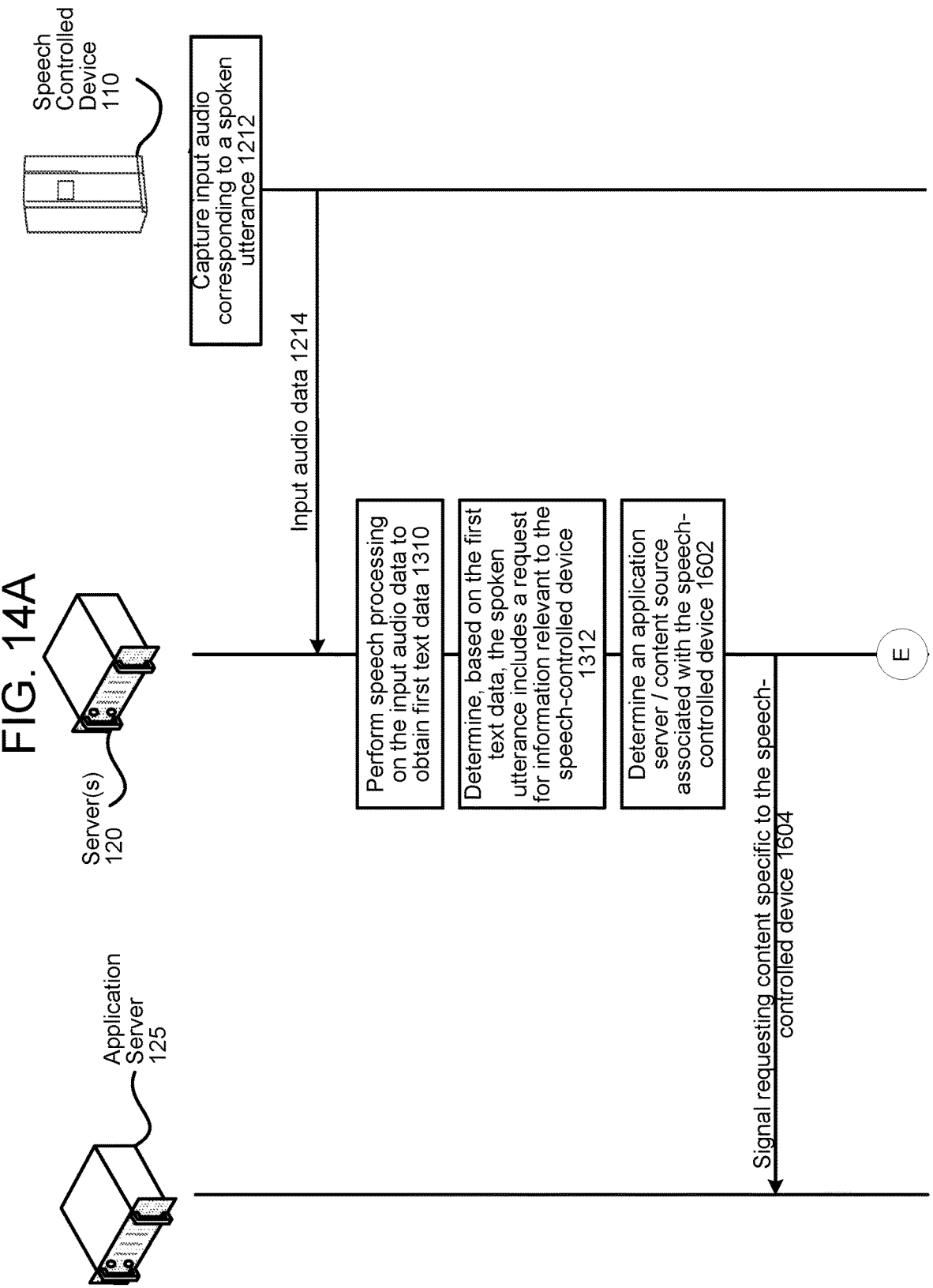

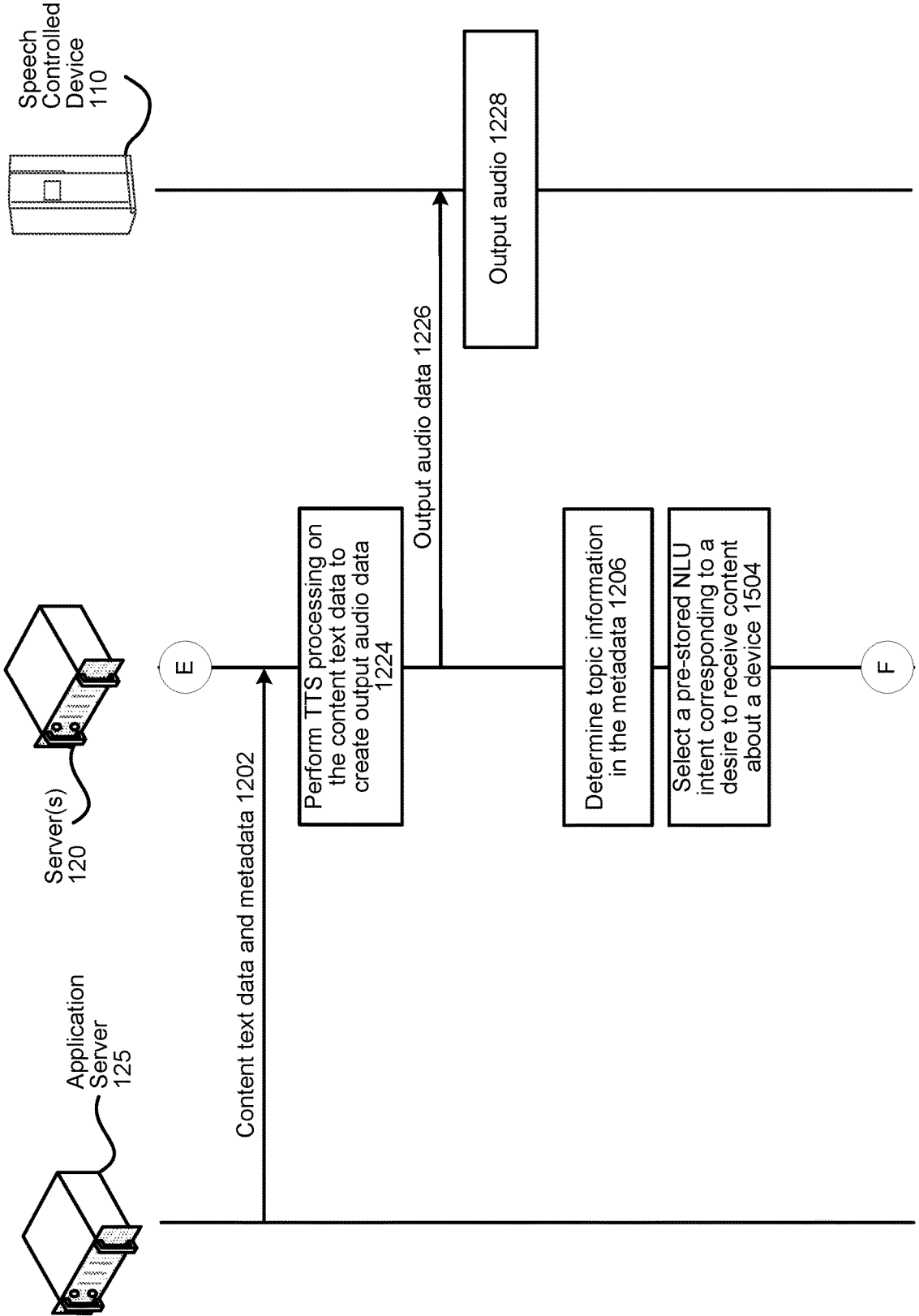

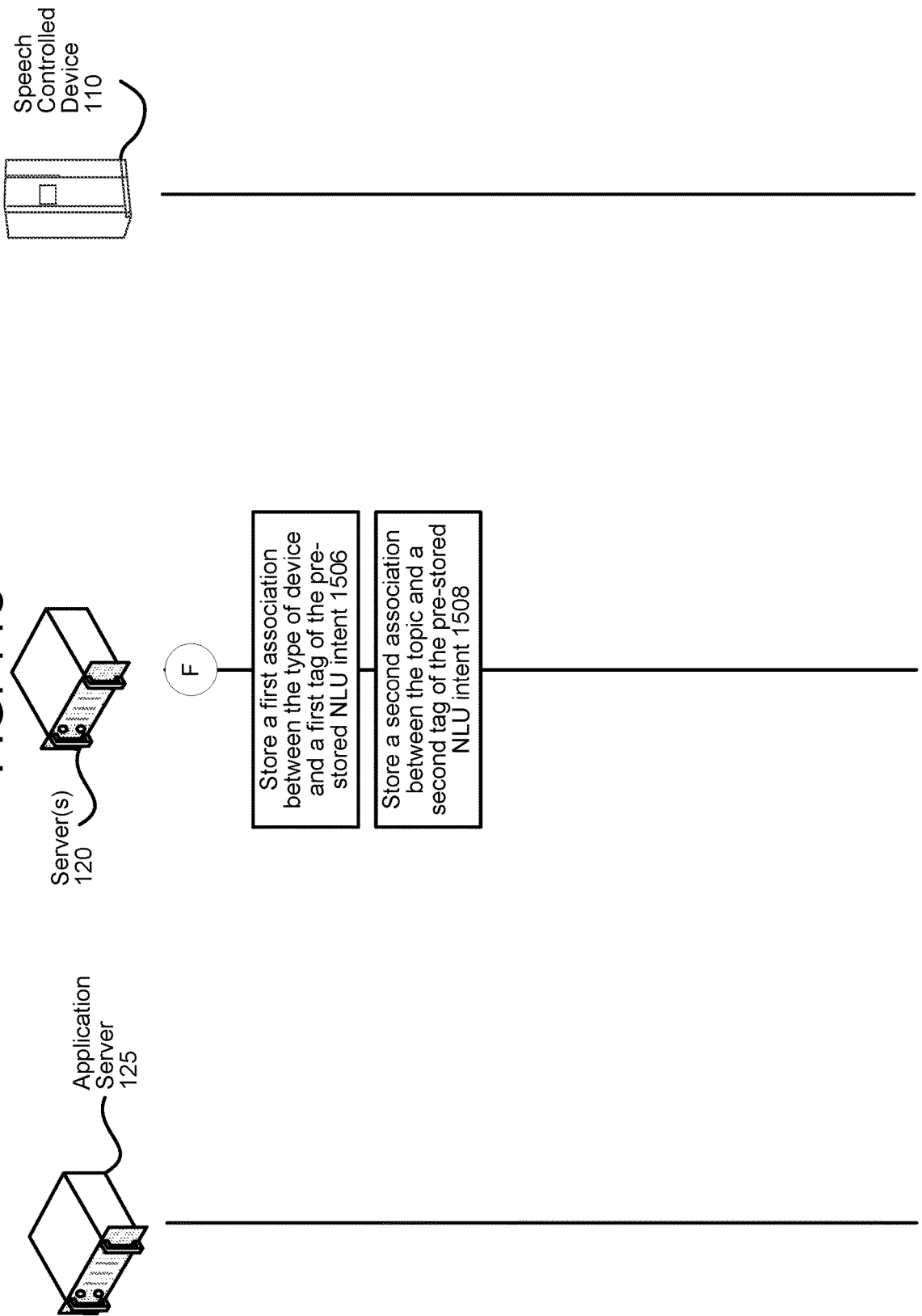

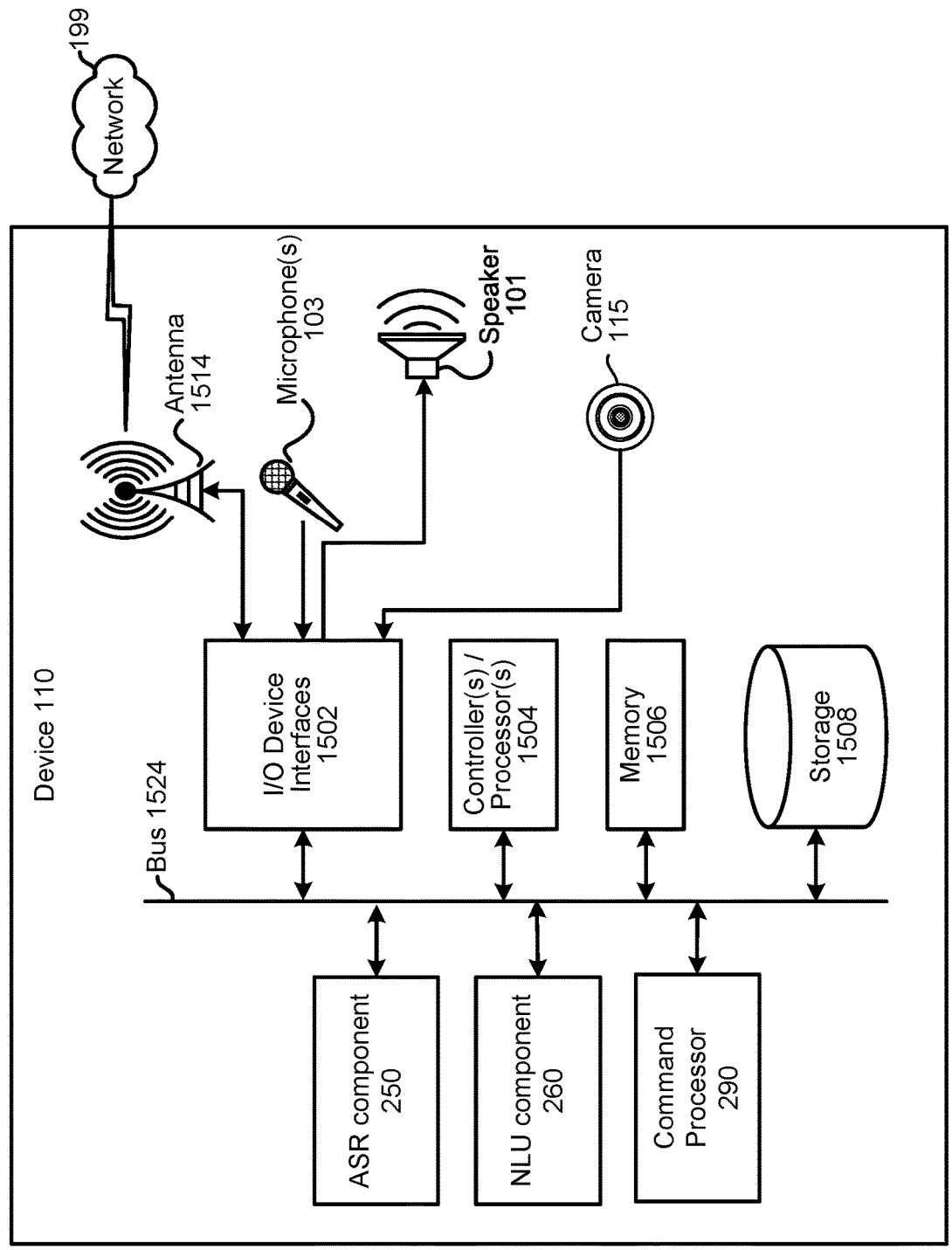

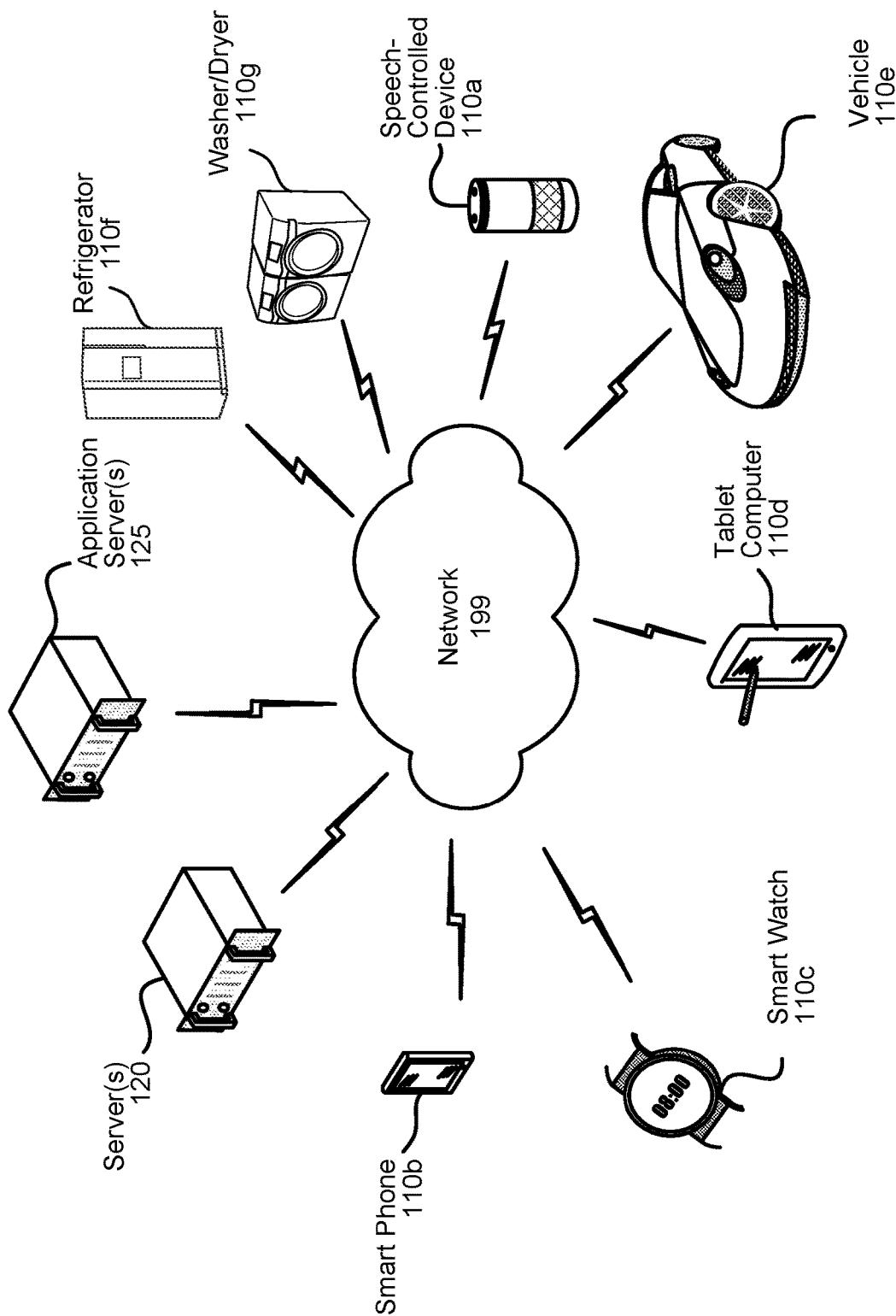

MULTI-PORTION SPOKEN COMMAND FRAMEWORK

CROSS-REFERENCE TO RELATED APPLICATION DATA

This application is a continuation of and claims priority to U.S. Nonprovisional patent application Ser. No. 15/466,271, entitled "MULTI-PORTION SPOKEN COMMAND FRAMEWORK," filed on Mar. 22, 2017, which is a Nonprovisional Patent application claiming priority to Provisional Patent Application No. 62/435,154, entitled "MULTI-PORTION SPOKEN COMMAND FRAMEWORK," filed on Dec. 16, 2016, the contents of which are both expressly incorporated herein in their entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 8 illustrates stored and associated content data and metadata for easy recall in response to receiving a spoken command according to embodiments of the present disclosure.

FIG. 10 illustrates a content source's labels may be associated with generalized and specific IC components.

FIG. 11 illustrates a content source's labels may be associated with generalized and specific NER components.

FIGS. 12A through 12C are a system flow diagram illustrating creating a multi-portion spoken command framework and executing a spoken command according to embodiments of the present disclosure.

FIGS. 13A through 13C are a system flow diagram illustrating creating a multi-portion spoken command framework specific to a type of device and executing a spoken command specific to the type of device according to embodiments of the present disclosure.

FIGS. 14A through 14C are a system flow diagram illustrating executing a spoken command specific to a type of device and thereafter creating a multi-portion spoken command framework specific to the type of device according to embodiments of the present disclosure.

FIG. 15 is a block diagram conceptually illustrating example components of a device according to embodiments of the present disclosure.

FIG. 17 illustrates an example of a computer network for use with the system.

DETAILED DESCRIPTION

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Speech processing systems have become robust platforms enabled to perform a variety of speech related tasks such as playing music, controlling household devices, communicating with other users, shopping, etc. Speech processing systems may process a spoken utterance to obtain content responsive thereto (for example output music, news content, or the like). Speech processing systems may also process a spoken utterance, and therefrom perform TTS processing to create computer-generated speech responsive to the spoken utterance thus enabling the system to engage in a conversation with a user and provide feedback and prompts in spoken form. For example, a user may speak a request to play music and the system may respond, in a spoken form "playing music" before actually outputting the music content.

Some speech processing systems communicate with a variety of services (i.e., content sources such as book publishers, article publishers, blog posters, etc.). Each service may desire to make content available to a user through a speech processing system. Services may store content in different formats, thereby making integration of content from different services difficult. One technique for enabling content from different services to be integrated within a single speech processing system is to construct an infrastructure and software specific to spoken commands for each type of content. By establishing such an infrastructure of existing intents, ways to access and navigate content, etc., content providers may be able to more easily provide content into the speech processing system and may bypass certain customization efforts.

The present disclosure improves traditional speech processing systems by providing an infrastructure through which multi-portion commands may be built for content from various services. According to the present disclosure, a speech processing system may receive content and metadata from a service. The speech processing system may associate (e.g., map) metadata to portions of an existing infrastructure of spoken commands that may be executed by the speech processing system to the new incoming content. This also allows more easy integration of content into the speech processing system.

Figure 1:
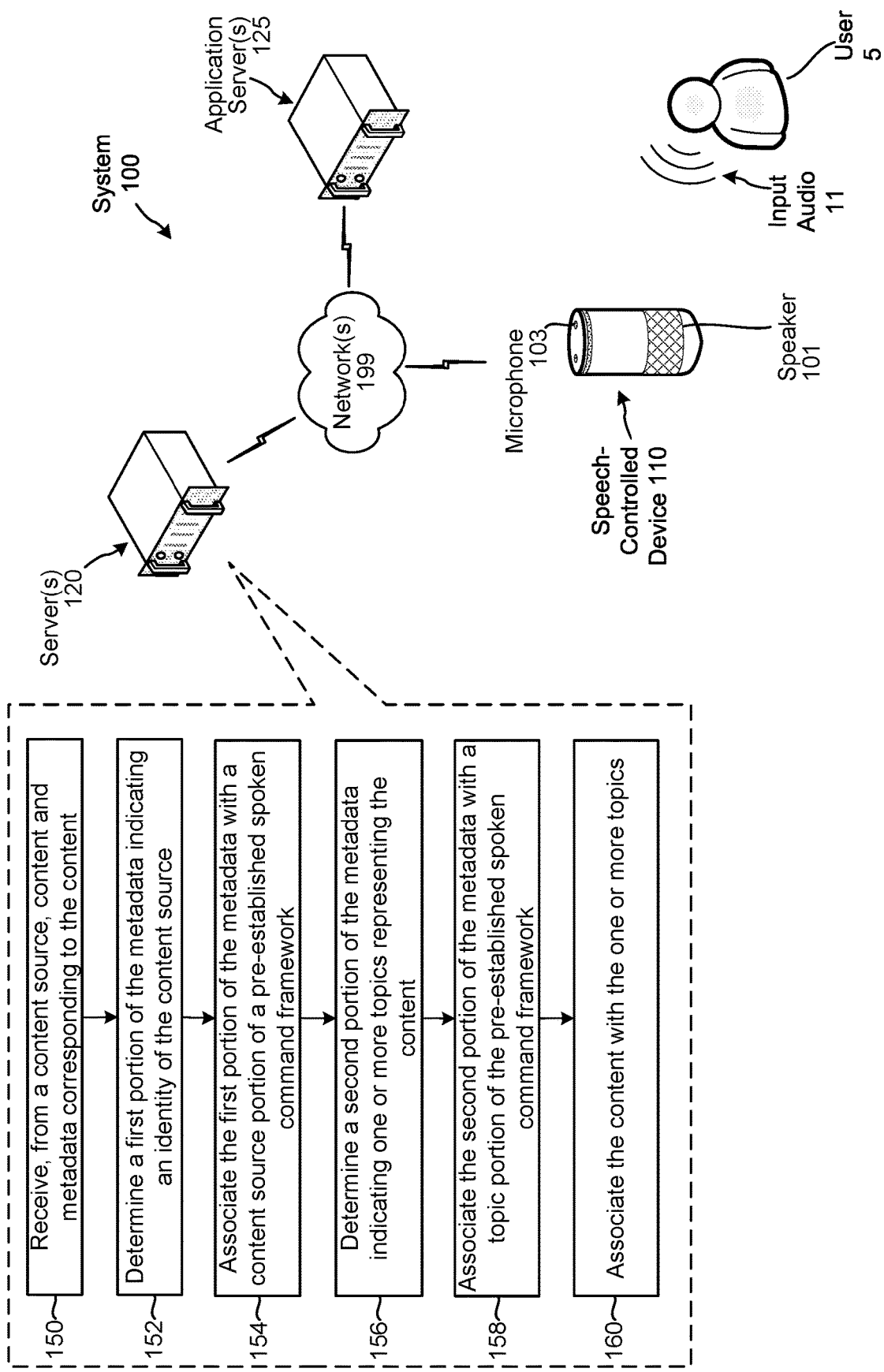
FIG. 1 illustrates a system for creating a multi-portion spoken command framework according to embodiments of the present disclosure.

FIG. 1 illustrates a system 100 configured to create a spoken command framework according to the present disclosure. Although the figures and discussion illustrate certain operational steps of the system 100 in a particular order, the steps described may be performed in a different order (as well as certain steps removed or added) without departing from the intent of the disclosure. As shown in FIG. 1, the system 100 may include a speech-controlled device 110 local to a user 5, and a server(s) 120 connected to the speech-controlled device 110 across a network(s) 199. The server(s) 120 (which may be one or more different physical devices) may be capable of performing speech processing (e.g., ASR, NLU, command processing, etc.), TTS processing, and user recognition as described herein. A single server 120 may perform all speech processing, TTS processing, and user recognition. Alternatively, multiple servers 120 may combine to perform all speech processing, TTS processing, and user recognition. For example, multiple devices may combine to perform ASR, multiple devices may combine to perform NLU, etc. Further, the server(s) 120 may execute certain commands, such as answering spoken utterances of the user 5. In addition, certain speech detection or command execution functions may be performed by the speech-controlled device 110.

As illustrated in FIG. 1, the server(s) 120 may receive (150) content and metadata from a content source, such as an application server(s) 125. Receiving the content and metadata may involve the content and metadata being pushed to the server(s) 120 by the content source(s). Alternatively, receiving the content and metadata may involve the server(s) 120, or another component of the system 100, pulling the content and metadata from the content source(s). This may include, for example, the server(s) 120 or other component pulling content and metadata from one or more websites. The content may be a single portion of content, i.e., a single blog post, a single article, etc. Alternatively, the content may be more than one blog post, article, or the like, such as a group of articles about various subjects. The metadata may include content breaks identifying start and end points of respective portions of content. These start and end points may correspond to start and end points of a pre-established content organization framework, for example as discussed below in reference to FIG. 6. For example, the metadata may include section breaks indicating start (and optionally stop) points of respective sections of a portion of content. The section breaks may be associated with lines or words of the content. The metadata may further include a portion indicating the content source from which it was sent, as well as topic data describing the content of the content portions. The topic data may be specific to each portion of content. Moreover, the topic data may be specific to each section of a portion of content. Each portion of content, or each section therein, may be associated with one or more topics. In certain configurations, a single topic may only point to/be associated with a single portion of content, or section therein. This prevents the server(s) 120 from receiving a spoken command including a topic, and being unable to determine a single portion of content, or section therein, associated with the topic.

The received content may be tagged with speech synthesis markup language (SSML). The SSML may indicate words, phonemes, etc. in the content that should be synthesized into computer generated speech to have a certain pronunciation for purposes of text-to-speech (TTS) processing. SSML tags may be used when a spelling of text data in the content would result in an improper pronunciation in the absence of an SSML tag.

The server(s) 120 may determine (152) a portion of the metadata indicating the identity of the application server 125, and may associate (154) that portion of the metadata with a content source portion of a pre-established spoken command framework. For example, the spoken command framework may correspond to <intent><content source> about <topic>. As such, the portion of the metadata indicating the identity may be associated with the <content source> portion of the spoken command framework. Creating this association may include storing the portion of the metadata indicating the identity, storing data indicating the <content source> tag, and associating the stored portions of data. Alternatively, creating this association may include re-training an NLU model as described herein. The server(s) 120 may also determine (156) a portion of the metadata indicating one or more topics specific to a portion of the content (e.g., article, section, etc.), and may associate (158) that portion of the metadata with the <topic> portion of the pre-established spoken command framework. Creating this association may include storing the portion of the metadata indicating the topic(s), storing data indicating the <topic> tag, and associating the stored portions of data. Alternatively, creating this association may include re-training an NLU model as described herein. The server(s) 120 may also associate (160) portions of the content to respective topic(s) data to ensure that when a topic is spoken in a command, appropriate content is determined. Other associations are also possible.

The speech-controlled device 110 may thereafter capture speech (i.e., input audio 11) of a user 5 via a microphone 103 of the speech-controlled device 110. The speech-controlled device 110 may then send audio data corresponding to the input audio 11 to the server(s) 120. Alternatively, a microphone array (not illustrated), separate from the speech-controlled device 110, may capture the input audio 11. In an example, the microphone array is in direct communication with the speech-controlled device 110 such that when the microphone array captures the input audio 11, the microphone array sends the audio data to the speech-controlled device 110. The speech-controlled device 110 may then forward the received audio data to the server(s) 120. In another example, the microphone array is in indirect communication with the speech-controlled device 110 via a companion application of a mobile computing device, such as a smart phone, tablet, laptop, etc. In this example, when the microphone array captures the input audio 11, the microphone array sends the audio data to the companion application, which forwards the audio data to the speech-controlled device 110. The speech-controlled device 110 may then forward the audio data to the server(s) 120. In yet another example, the microphone array is in indirect communication with the server(s) 120 via the companion application such that when the microphone array captures the input audio 11, the microphone array sends the audio data to the companion application, which forwards the audio data to the server(s) 120.

The server(s) 120 receives input audio data including the spoken utterance from the speech-controlled device 110 or a companion application (depending upon implementation as described herein above). The server(s) 120 performs ASR on the input audio data to create input text data. The input text data may correspond to "ask my doctor about acne." The server(s) 120 performs NLU on the input text data to determine NLU results. The NLU results may include tagged input text data. For example, the NLU processing may determine the portion of the input text data corresponding to "ask" relates to an "ask" command intent, the portion of the input text data corresponding to "my doctor" refers to a particular content source called "MyDoctor", and the portion of the input text data corresponding to "acne" corresponds to a topic. The server(s) 120 may use the tagged NLU results (e.g., tagged text data corresponding to ask <intent> my doctor <content source> about acne <topic>) to determine content associated with the MyDoctor application server and the acne topic. Once the content is determined, the server(s) 120 may perform TTS processes on stored content text data to create output audio corresponding to the content. The server(s) 120 may then cause the speech-controlled device 110 (or another device associated with a profile of the user) to output the output audio.

The speech processing system 100 may also be configured to allow a user to speak command to control output of the content. For example, while the audio is being output, the server(s) 120 may pause the output in response to a corresponding spoken command, may resume the output in response to a corresponding spoken command, and may fast play, back up, or skip sections in response to corresponding spoken commands.

Figure 2:
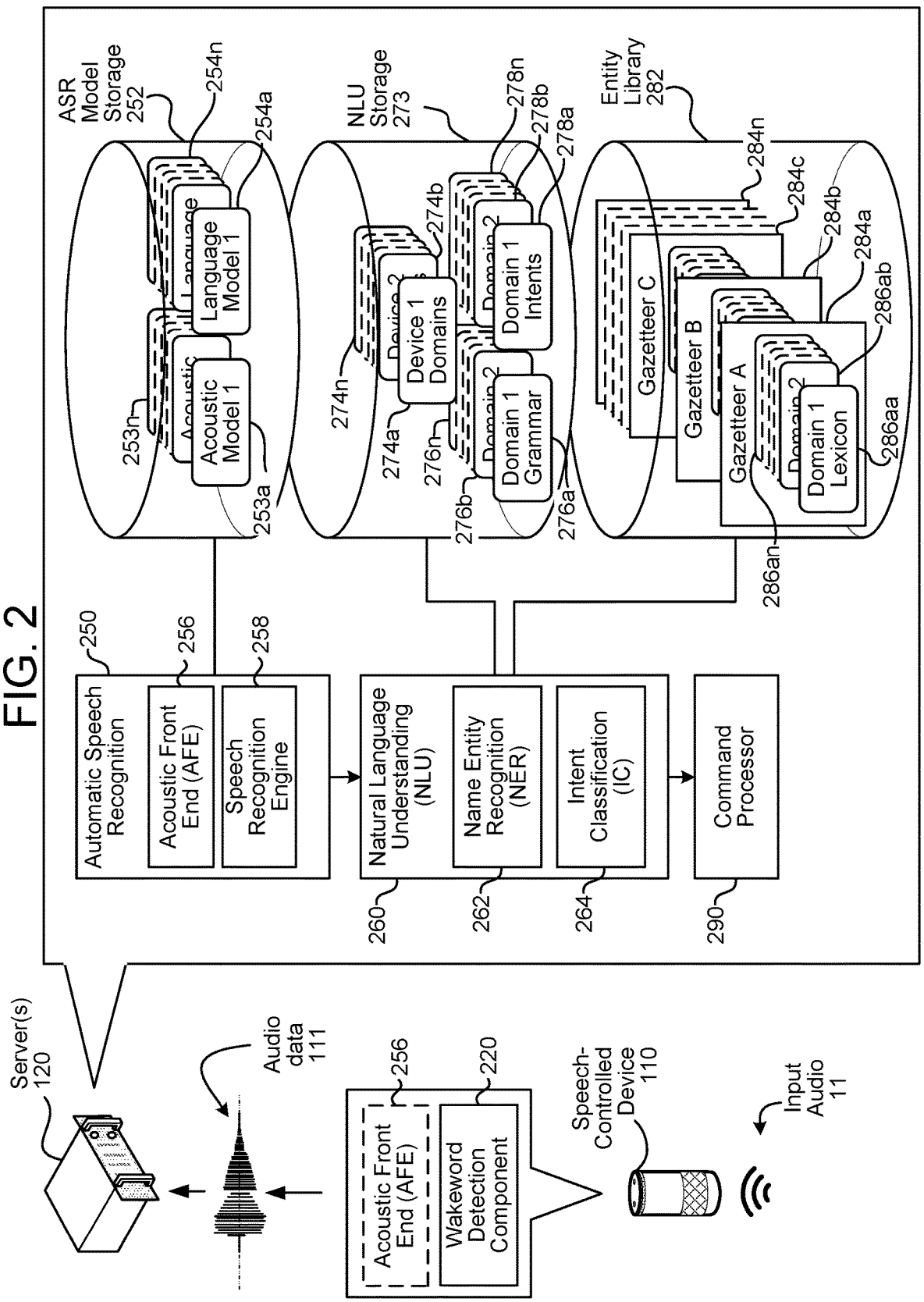
FIG. 2 is a conceptual diagram of how a spoken utterance may be processed according to embodiments of the present disclosure.

Further details of the system 100 configured to create a multi-portion command are explained below, following a discussion of the overall speech processing system of FIG. 2. The system 100 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. An audio capture component, such as the microphone 103 of the speech-controlled device 110 (or other device), captures input audio 11 corresponding to a spoken utterance. The device 110, using a wakeword detection component 220, then processes audio data corresponding to the input audio 11 to determine if a keyword (such as a wakeword) is detected in the audio data. Following detection of a wakeword, the speech-controlled device 110 sends audio data 111, corresponding to the utterance, to a server 120 that includes an ASR component 250. The audio data 111 may be output from an acoustic front end (AFE) 256 located on the device 110 prior to transmission, or the audio data 111 may be in a different form for processing by a remote AFE 256, such as the AFE 256 located with the ASR component 250.

The wakeword detection component 220 works in conjunction with other components of the device 110, for example the microphone 103 to detect keywords in audio data corresponding to the input audio 11. For example, the device 110 may convert input audio 11 into audio data, and process the audio data with the wakeword detection component 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in input audio based on various quantitative aspects of the input audio, such as a spectral slope between one or more frames of the input audio; energy levels of the input audio in one or more spectral bands; signal-to-noise ratios of the input audio in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMI) or Gaussian Mixture Model (GMM) techniques may be applied to compare the input audio to one or more acoustic models in speech storage, which acoustic models may include models corresponding to speech, noise (such as environmental noise or background noise), or silence. Still other techniques may be used to determine whether speech is present in the input audio.

Once speech is detected in the input audio, the device 110 may use the wakeword detection component 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each wakeword and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN)-HMM decoding framework. In another embodiment the wakeword spotting system may be built on DNN/recursive neural network (RNN) structures directly, without HMI involved. Such a system may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing (e.g., for purposes of executing a command in the speech). The audio data 111 may include data corresponding to the wakeword, or the portion of the audio data corresponding to the wakeword may be removed by the local device 110 prior to sending the audio data 111 to the server 120.

Upon receipt by the server(s) 120, an ASR component 250 may convert the audio data 111 into text data. The ASR component 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledge base (i.e., ASR model storage 252). For example, the ASR component 250 may compare the audio data 111 with models for sounds (e.g., subword units or phonemes) and sequences of sounds to identify words that match the sequence of sounds spoken in the spoken utterance of the audio data 111.

The different ways a spoken utterance may be interpreted (i.e., the different hypotheses) may each be assigned a respective probability/confidence score representing a likelihood that a particular set of words matches those spoken in the spoken utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR component 250 outputs the most likely text recognized in the audio data 111. The ASR component 250 may also output multiple hypotheses in the form of a lattice or an N-best list with each hypothesis corresponding to a confidence score or other score (e.g., such as probability scores, etc.).

The device or devices including the ASR component 250 may include an AFE 256 and a speech recognition engine 258. The AFE 256 transforms the audio data 111 into data for processing by the speech recognition engine 258. Such transformation is discussed in further detail with regard to FIG. 7 below. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. In one configuration each audio frame includes 25 ms of audio and the frames start at 10 ms intervals resulting in a sliding window where adjacent audio frames include 15 ms of overlapping audio. Many different features may be determined, as known in the art, and each feature represents some quality of the audio data 111 that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 258 may process data output from the AFE 256 with reference to information stored in the ASR model storage 252. Alternatively, post-AFE processed data (e.g., feature vectors) may be received by the device executing ASR processing from another source besides the internal AFE 256. For example, the speech-controlled device 110 may process audio data 111 into feature vectors (e.g., using an on-device AFE 256) and transmit the feature vector data to the server 120 across the network 199 for ASR processing. Feature vector data may arrive at the server 120 encoded, in which case it may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 250 will output speech results that make sense grammatically.

The speech recognition engine 258 may use a number of techniques to match feature vectors to phonemes, for example using HMMs to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text data into commands for execution, either by the speech-controlled device 110, by the server 120, or by another device (e.g., a server running a search engine, etc.). For example, the ASR component 250 may output text data 300 for further processing by an NLU 260, where the text data 300 may include a single top scoring hypothesis or an N-best list including multiple hypotheses. Further, the ASR component 250 may output ASR confidence score data 807 for further processing by a user verification component 1202 (discussed below) or other component. The ASR confidence score data 807 may include a respective score for each hypothesis in an N-best list or may include a single score for the top hypothesis output as the text data 300. In other configurations the ASR confidence score data 807 may include general confidence data, such as one or more values that indicate how generally confident the ASR component 250 was in its processing, without necessarily linking that confidence to a specific hypothesis. The ASR confidence score data 807 may be based on various factors such as audio quality, whether the hypotheses had similar scores or whether one hypothesis largely outscored the others, or other factors.

The device performing NLU processing (e.g., the server 120) may include various components, including potentially dedicated processor(s), memory, storage, etc. The device performing NLU processing may include a dedicated NLU component 260, which may include a named entity recognition (NER) component 262, and intent classification (IC) component 264. The device performing NLU processing may additionally include NLU storage 273, and a knowledge base (not illustrated). The knowledge base is a database or other information storage that may include information about entities that may be used in resolving spoken utterances. The NLU component 260 may also utilize gazetteer information 284 stored in an entity library storage 282. The knowledge base and/or gazetteer information 284 may be used for entity resolution, for example matching ASR results with different entities (e.g., song titles, contact names, etc.). Gazetteers 284 may be linked to users (e.g., a particular gazetteer may be associated with a specific user's music collection), may be linked to certain domains (e.g., shopping), or may be organized in a variety of other ways.

The NLU component 260 takes text data (e.g., output from the ASR component 250 based on the input audio data 111) and attempts to make a semantic interpretation of the text data. That is, the NLU component 260 determines the meaning behind the text data based on the individual words and then implements that meaning. The NLU component 260 interprets a text string to derive an intent or a desired action from the user as well as the pertinent pieces of information in the text data that allow a device (e.g., the speech-controlled device 110, the server 120, an application server, etc.) to complete that action. For example, if a spoken utterance is processed using the ASR component 250, which outputs the text data "call mom", the NLU component 260 may determine the user intended to activate a telephone in his/her device and to initiate a call with a contact matching the entity "mom."

The NLU component 260 may process several textual inputs related to the same utterance. For example, if the ASR component 250 outputs N text segments (e.g., as part of an N-best list), the NLU component 260 may process all N outputs to obtain NLU results.

The NLU component 260 may be configured to parse and tag to annotate text data as part of NLU processing. For example, for the text data "call mom," "call" may be tagged as a command (e.g., to execute a phone call) and "mom" may be tagged as a specific entity and target of the command. In addition, the telephone number for the entity corresponding to "mom" stored in a contact list may be included in the annotated NLU results.

To correctly perform NLU processing of speech input, the NLU component 260 may be configured to determine a "domain" of the utterance so as to determine and narrow down which services offered by an endpoint device (e.g., the server 120, the speech-controlled device 110, an application server, etc.) may be relevant. For example, an endpoint device may offer services relating to interactions with a telephone service, a contact list service, a calendar/scheduling service, a music player service, etc. Words in text data may implicate more than one service, and some services may be functionally linked (e.g., both a telephone service and a calendar service may utilize data from the contact list).

The NER component 262 receives an utterance in the form of ASR results and attempts to identify relevant grammars and lexical information that may be used to construe meaning. To do so, the NER component 262 may begin by identifying potential domains that may relate to the received utterance. The NLU storage 273 includes a database of domains 274 associated with specific devices. For example, the speech-controlled device 110 may be associated with domains for music, telephony, calendaring, contact lists, and device-specific communications. In addition, the entity library 282 may include database entries about specific services on a specific device, either indexed by Device ID, User ID, Household ID, or some other indicator.

A domain may represent a discrete set of activities having a common theme, such as "shopping", "music", "calendaring", etc. As such, each domain may be associated with a particular language model and/or grammar database 276, a particular set of intents/actions 278, and/or a particular personalized lexicon 286. Each gazetteer 284 may include domain-indexed lexical information associated with a particular user and/or device. For example, the Gazetteer A 284a includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both communications and music, the utterance will be NLU processed using the grammar models and lexical information for communications, and will also be processed using the grammar models and lexical information for music. The responses to the spoken utterance produced by each set of models is scored, with the overall highest ranked result from all applied domains being ordinarily selected to be the correct result. This is described further in detail below in reference to FIG. 3.

An IC component 264 parses the utterance to determine an intent(s) for each identified domain, where the intent(s) corresponds to the action to be performed that is responsive to the spoken utterance. Each domain is associated with a database 278 of words linked to intents. For example, a music intent database may link words and phrases such as "quiet," "volume off," and "mute" to a "mute" intent. The IC component 264 identifies potential intents for each identified domain by comparing words in the utterance to the words and phrases in the intents database 278.

In order to generate a particular interpreted response, the NER component 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user and/or the device. For instance, a grammar model 276 associated with a shopping domain may include a database of words commonly used when people discuss shopping.

The intents identified by the IC component 264 are linked to domain-specific grammar frameworks (included in 276) with "slots" or "fields" to be filled. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 262 may parse the spoken utterance to identify words as subject, object, verb, preposition, etc., based on grammar rules and models, prior to recognizing named entities. The identified verb may be used by the IC component 264 to identify intent, which is then used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 262 then searches the corresponding fields in the domain-specific and personalized lexicon(s), attempting to match words and phrases in the utterance tagged as a grammatical object or object modifier with those identified in the database(s).

This process includes semantic tagging, which is the labeling of a word or combination of words according to their type/semantic meaning. Parsing may be performed using heuristic grammar rules, or the NER component 262 may be constructed using techniques such as HMIs, maximum entropy models, log linear models, conditional random fields (CRF), and the like.

For instance, an utterance of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 264 will determine corresponds to the "play music" intent. No determination has been made as to the meaning of "mother's little helper" and "the rolling stones," but based on grammar rules and models, it is determined that these phrases relate to the grammatical object of the spoken utterance.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 262 may search the database of generic words associated with the domain (i.e., in the NLU storage 273). For instance, if the utterance was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged utterance word or phrase, how closely the grammatical structure of the utterance corresponds to the applied grammatical framework, and based on whether the database indicates a relationship between an entry and information identified to fill other slots of the framework.

The NER component 262 may also use contextual operational rules to fill slots. For example, if a user had previously requested to pause a particular song and thereafter requested that the speech-controlled device 110 "please un-pause my music," the NER component 262 may apply an inference-based rule to fill a slot associated with the name of the song that the user currently wishes to play—namely the song that was playing at the time the user requested to pause the music.

The results of NLU processing may be tagged to attribute meaning to the utterance. So, for example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing, which may include tagged text data, commands, etc., may then be sent to a command processor 290, which may be located on a same or separate server 120 as part of the system 100. The system 100 may include more than one command processor 290, and the command processor 290 may be determined based on the NLU output. For example, if the NLU output includes a command to play music, the command processor 290 selected may correspond to a music playing application, such as one located on the speech-controlled device 110 or in a music playing appliance, configured to execute a music playing command. Many such command processors 290 may be available to the system depending on the various applications that may be invoked. If the NLU output includes a search utterance (e.g., requesting the return of search results), the command processor 290 selected may include a search engine processor, such as one located on a search server, configured to execute a search command and determine search results, which may include output text data to be processed by a TTS engine and output from a device as synthesized speech.

Figure 3:
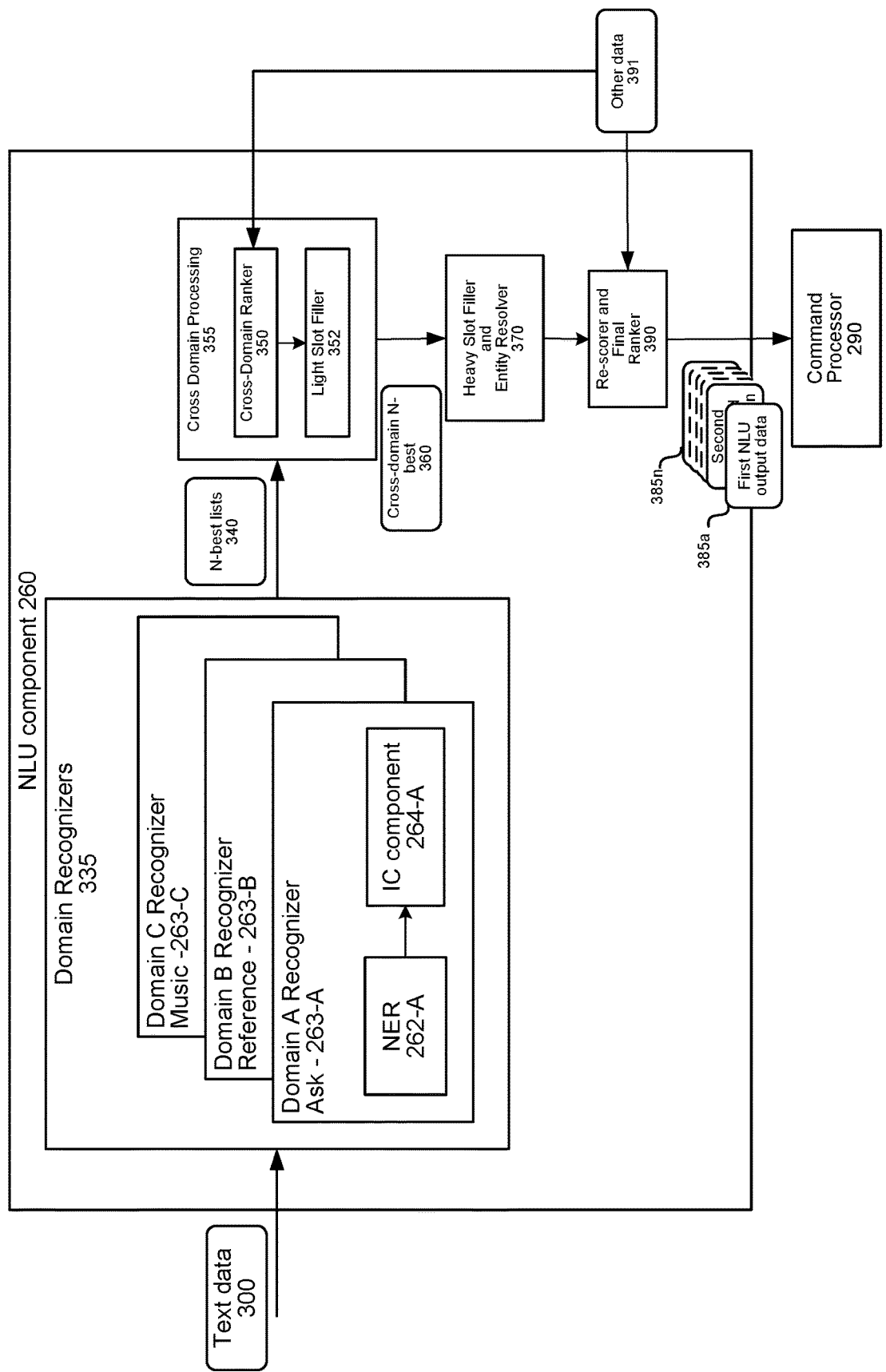
FIG. 3 is a conceptual diagram of a system architecture for parsing incoming utterances using multiple domains according to embodiments of the present disclosure.

The NLU operations of the system 100 may take the form of a multi-domain architecture, such as that illustrated in FIG. 3. In the illustrated architecture, each domain (which may include a set of intents and entity slots that define a larger concept such as music, books etc. as well as components such as trained models, etc. used to perform various NLU operations such as NER, IC, or the like) may be constructed separately and made available to the NLU component 260 during runtime operations where NLU operations are performed on text (such as text output from the ASR component 250). Each domain may have specially configured components to perform various steps of the NLU operations.

For example, the system 100 may include a multi-domain architecture consisting of multiple domains for intents/commands executable by the system 100 (or by other devices connected to the system 100), such as music, video, books, and information. The system 100 may include a plurality of domain recognizers 335, where each domain may include its own recognizer 263. Each recognizer may include various NLU components such as an NER component 262, IC component 264 and other components such as an entity resolver, or other components.

For example, an ask domain recognizer 263-A (Domain A) may have an NER component 262-A that identifies what slots (i.e., portions of input text data 300) may correspond to particular words relevant to that domain (e.g., what words describe subjects that user may ask about). The words may correspond to entities such as (for the ask domain) a content source, content subject, etc. An NER component 262 may use a machine learning model, such as a domain specific conditional random field (CRF) to both identify the portions corresponding to an entity as well as identify what type of entity corresponds to the text data portion. For example, for the text "ask [content source] about [subject]," an NER 262-A trained for an ask domain may recognize the portion of text in the place of [content source] corresponds to a content source. The ask domain recognizer 263-A may also have its own intent classification (IC) component 264-A that determines the intent of the text assuming that the text is within the proscribed domain. An IC component 264 may use a model, such as a domain specific maximum entropy classifier to identify the intent of the text, where the intent is the action the user desires the system 100 to perform.

As illustrated in FIG. 3, multiple domains may operate substantially in parallel, with different domain specific components. That is, domain B for "reference" may have its own recognizer 263-B including NER component 262-B, and IC component 264-B. Domain C for music may also have similar components in its recognizer 263-C, and so on for the different domains available to the system. When input text data 300 (e.g., ASR output text data) is received, the same text data that is input into the NLU pipeline for domain A 263-A may also be input into the NLU pipeline for domain B 263-B, where the components for domain B 263-B will operate on the text data as if the text data related to domain B, and so on for the different NLU pipelines for the different domains. Each domain specific NLU pipeline will create its own domain specific NLU results, for example NLU results A (for domain A), NLU results B (for domain B), NLU results C (for domain C), and so on. The different NLU results may then be ranked and further processed using other downstream components as explained below.

As shown in FIG. 3, an NER component 262 and IC component 264 may be considered part of a recognizer (such as recognizer 263-A, 263-B, 263-C, etc.). The recognizers may operate using machine learning trained models such as a CRF, maximum entropy classifier, neural network (such as a deep neural network (DNN) or recurrent neural network (RNN)), or other classifier. The recognizers 335 may also use rules that operate on input query text data in a particular form to identify named entities and/or intents. The recognizers 335 may also operate using a data structure such as a finite state transducer (FST) to process the query text data to perform NER and/or IC. Other techniques or models may also be used to perform NER and/or IC. The techniques may also be used together. For example, a set of rules, an FST, and a trained machine learning model may all operate on input text data substantially in parallel to determine the named entities/intents of an input utterance. If one technique performs its task with high enough confidence, the system 100 may use the output of that technique over the others. The system 100 may also prioritize the results of different techniques in certain circumstances (for example rules results may be higher priority than FST results, which may be higher priority than model results, or some other configuration). Each recognizer (such as 263-A, 263-B, 263-C, etc.) may have its own rules, FSTs, and/or models operating such that each recognizer operates substantially in parallel to the other recognizers to come up with its own interpretation of the input text data.

The output of each recognizer 335 is an N-best list 340 of intents and identified slots representing the particular recognizer's top choices as to the meaning of the input text data, along with scores for each item in the N-best list 340. For example, for input text data 300 of "play poker face by lady gaga," the music domain recognizer 263-C may output an N-best list 340 in the form of:

[0.95] PlayMusicIntent ArtistName: Lady Gaga SongName: Poker Face

[0.02] PlayMusicIntent ArtistName: Lady Gaga

[0.01] PlayMusicIntent ArtistName: Lady Gaga AlbumName: Poker Face

[0.01] PlayMusicIntent SongName: Pokerface where the NER component 262-C of the recognizer 263-C has determined that for different items in the N-best list 340, the words "poker face" correspond to a slot and the words "lady gaga" correspond to a slot. (Though different items in the N-best list 340 interpret those slots differently, for example labeling "poker face" as a song name in one choice but labeling it as an album name in another.) The IC component 264-C of the recognizer 263-C has also determined that the intent of the input text data 300 is a PlayMusicIntent (and selected that as the intent for each item on the music N-best list 340). The recognizer 263-A also determined a score for each item on the list representing the recognizer's confidence that the particular item is correct. As can be seen in the example, the top item has the highest score. Each recognizer of the recognizers 335 may operate on the input text data 300 substantially in parallel, resulting in a number of different N-best lists 340, one for each domain (e.g., one N-best 340 list for ask, one N-best list 340 for reference, etc.). The size of any particular N-best list 340 output from a particular recognizer is configurable and may be different across domains.

While the recognizers 335 perform NER, that is they may identify words of the input text data 300 that are important for downstream processing (sometimes called light slot filling), and may even label those words according to type (such as artist name, album name, city, or the like), the recognizers 335 may not perform entity resolution (i.e., determining the actual entity corresponding to the words of the input text data 300). Entity resolution is typically a higher latency process and involves communications with a knowledge base 272 or other component to precisely identify the specific entities. As this process is resource intensive, it may be preferable to not perform this task for each item of every N-best list 340 across the multiple domains as some items have low scores and are unlikely to be used and any resources spent performing entity resolution would be wasted on low scoring items. Thus, a filtering of potential results may first be performed before engaging in more resource intensive processing. To that end, the cumulative N-best lists 340 may be passed to a cross domain processing component 355 which may then further rank the individual items on the N-best lists 340 as well as perform other operations.

The cross domain processing component 355 may include a cross-domain ranker 350. The cross-domain ranker 350 takes the group of N-best lists 340 and selects from among the lists 340 the top choices to create a new N-best list 360 that may include items from different domains, but only includes the highest scoring ones of those domains. The purpose of the cross-domain ranker 350 is to create a new list of top scoring potential results, so that downstream (more resource intensive) processes may only operate on the top choices.

As an example of a multi-domain N-best list 360 created by the cross-domain ranker 350, take the example input text data 300 of "ask my doctor about acne." The text data 300 may be processed by each of the recognizers 335, and each will output an N-best list 340, resulting in a group of N-best lists 340 input into the cross domain processing component 355. The cross-domain ranker 350 may then rank the individual items among the N-best lists 340 to create a new N-best list 360. For example, the cross-domain ranker 350 may output an N-best list 360 in the form of:

| | | |
|---|---|---|
| [0.78] Ask | PlayContent ContentSource: MyDoctor | ContentName: Acne |
| [0.13] Reference | ReadWiki ArticleName: Acne | |
| [0.07] Music | PlayMusicIntent AlbumName: Acne | | where the top items from different N-best lists 340 from multiple domains are grouped into a single N-best list 360. As shown, the top scoring item is from the ask domain 263-A, which includes the intent "playcontent" with one slot for the content source "MyDoctor" and another slot for the content name corresponding to the text "acne." (The content source MyDoctor may correspond to a content source 125 that established content to the system as described herein, with "acne" being a topic name corresponding to an item of content from MyDoctor.) The next item is from the reference domain 263-B, and includes the intent "readwiki" and a slot labeled as article name corresponding to the text "acne." Each item in the N-best list 360 may also include a score. The size of the cross domain N-best list 360 is configurable.

While the cross-domain ranker 350 takes as input the N-best lists 340, it may also consider other information, such as other data 391.

The cross domain processing component 355 may also include a light slot filler component 352. The light slot filler 352 can take information from slots and alter it to make the data more easily processed by downstream components. The operations of the light slot filler 352 are typically low latency operations that do not involve heavy operations such as reference to a knowledge base. The purpose of the light slot filler 352 is to replace words with other words or values that may be more easily understood by downstream components. For example, if input text data 300 included the word "tomorrow", the light slot filler 352 may replace the word "tomorrow" with an actual date for purposes of downstream processing. Similarly, a word "CD" may be replaced by a word "album." The replaced words are then included in the cross domain N-best list 360.

The N-best list 360 is then output to a heavy slot filler and entity resolution component 370. The heavy slot filler and entity resolver 370 can apply rules or other instructions to standardize labels or tokens from previous stages into an intent/slot representation. The precise transformation may depend on the domain (for example, for a travel domain a text mention of "Boston airport" may be transformed to the standard BOS three-letter code referring to the airport). The resolver 370 can refer to an authority source (such as a knowledge base 272) that is used to specifically identify the precise entity referred to in the entity mention identified in the incoming text. Specific intent/slot combinations may also be tied to a particular source, which may then be used to resolve the text (such as by providing information or a command to be executed in response to a user query). For example, in the example "play songs by the stones," the resolver 370 may reference to a personal music catalog, Amazon Music account, user profile (discussed in detail below), or the like. The output from the entity resolution component 370 may include an altered N-best list that is based on the cross-domain N-best list 360 but also includes more detailed information about the specific entities mentioned in the text data 300 (such as specific entity IDs) and/or more detailed slot data that can eventually be used by a command processor 290 which may be incorporated into the same system components or pipeline or may be on a separate device in communication with the system 100. While illustrated as a cross-domain resolver, multiple resolution components 370 may exist where a particular resolution component 370 may be specific for one or more domains.

As can be appreciated, the entity resolver 370 may not necessarily be successful in resolving every entity and filling every slot. This may result in incomplete results in the combined N-best list 360. A re-scorer and final ranker component 390 may consider such errors when determining how to rank the ultimate results for potential execution. For example, if an item of the N-best list 360 comes from a book domain and includes a read book intent, but the entity resolver 370 cannot find a book with a title matching the input text data 300, that particular result may be re-scored by the final ranker 390 to be given a lower score. Each item considered by the final ranker 390 may also be assigned a particular confidence, where the confidence may be determined by a recognizer 335, cross domain processor 355, or by the final ranker 390 itself. Those confidence scores may be used to determine how to rank the individual NLU results represented in the N-best lists 340. The confidence scores may be affected by unfilled slots. For example, if one domain is capable of filling a slot (i.e., resolving the word in the slot to an entity or other recognizable form) for an input query, the results from that domain may have a higher confidence than those from a different domain that is not capable of filling a slot.

The final ranker 390 may be configured to apply re-scoring, biasing, or other techniques to obtain the most preferred ultimate result. To do so, the final ranker 390 may consider not only the NLU results of the N-best lists 340, but may also consider other data 391. This other data 391 may include a variety of information. For example, the other data 391 may include application rating or popularity. For example, if one application has a particularly high rating, the system 100 may increase the score of results associated with that particular application. The other data 391 may also include information about applications that have been specifically enabled by the user (as indicated in a user profile as discussed in detail below). NLU results from enabled applications may be scored higher than results from non-enabled applications. User history may also be considered, such as if the user regularly uses a particular supplemental application or does so at particular times of day. Date, time, location, weather, type of device 110, customer ID, context, and other information may also be considered. For example, the system 100 may consider when any particular applications are currently active (such as music being played, a game being played, etc.) between the system 100 and device 110. The highest scoring result (or results in the case of multiple commands being in an utterance) may be passed to a downstream command processor 290 for execution.

Following final ranking, the NLU component 260 may output NLU output data 385. The NLU output data 385 may include an indicator of the command to be executed along with data associated with the command, for example an indication that the command is "play music" and the music to be played is "Adele." The NLU output data 385 may be in the form of previous NLU data such as item(s) in N-best list 340, item(s) in cross-domain N-best list 360, or the like. The NLU output data 385 may also be in a format executable by the command processor 290. Multiple instances of NLU output data (e.g., 385a-385n) may be output.

Figure 4:
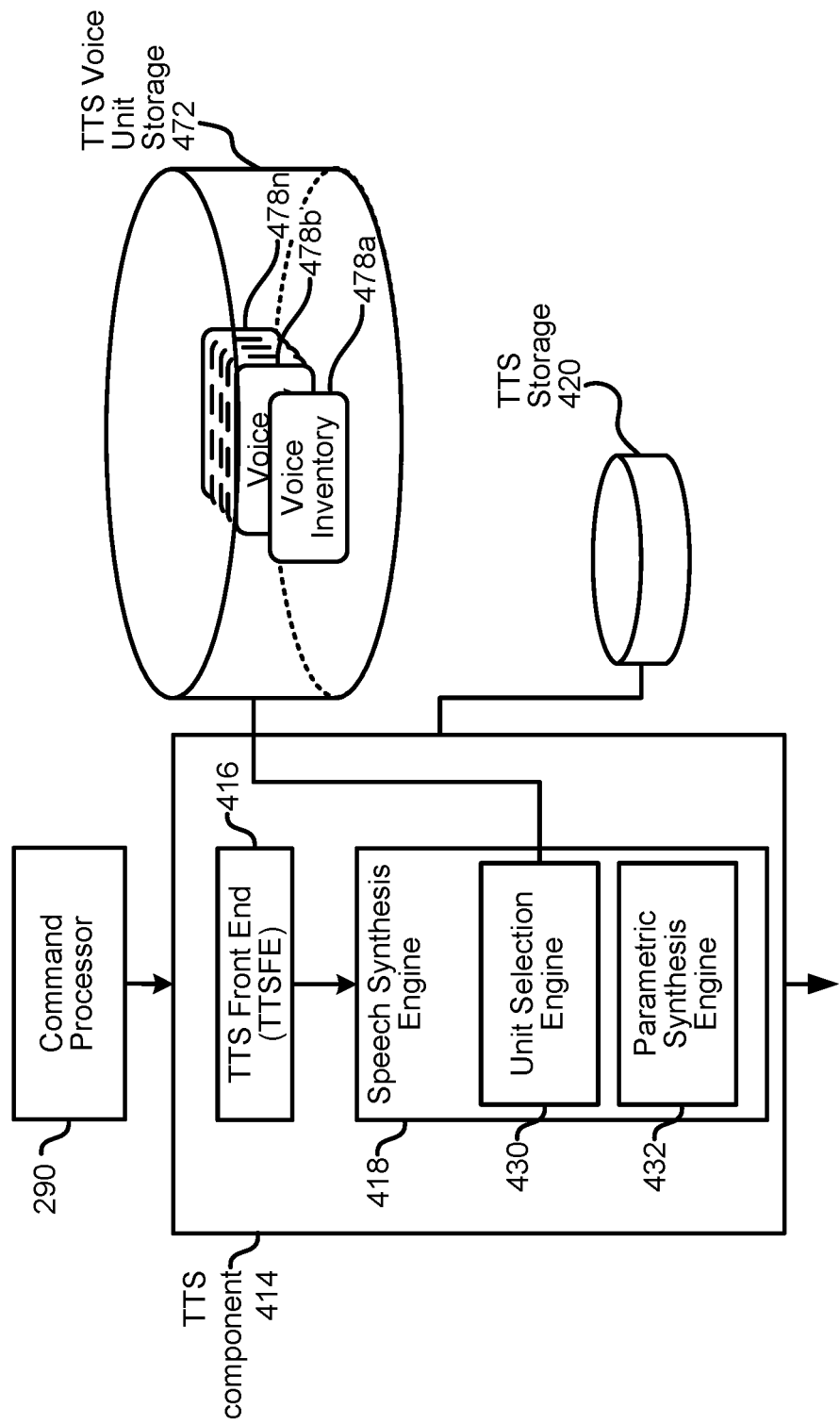
FIG. 4 is a conceptual diagram of how text-to-speech processing is performed according to embodiments of the present disclosure.

A TTS component 414 may receive tagged text data from the command processor 290, so the TTS component 414 may synthesize speech corresponding to the text data. Speech may be synthesized by the TTS component 414 as described below with respect to FIG. 4.

The TTS component 414 includes a TTS front end (TTSFE) 416, a speech synthesis engine 418, and a TTS storage 420. The TTSFE 416 transforms input text data (e.g., from the command processor 290) into a symbolic linguistic representation for processing by the speech synthesis engine 418. The TTSFE 416 may also process tags or other data input to the TTS component 414 that indicate how specific words should be pronounced. The speech synthesis engine 418 compares the annotated phonetic units and information stored in the TTS storage 420 for converting the input text data into speech (i.e., audio data). The TTSFE 416 and the speech synthesis engine 418 may include their own controller(s)/processor(s) and memory, or they may use the controller/processor and memory of the server 120, the speech-controlled device 110, or another device, for example. Similarly, the instructions for operating the TTSFE 416 and the speech synthesis engine 418 may be located within the TTS component 414, within the memory and/or storage of the server 120, the speech-controlled device 110, or within an external device.

Text data input into the TTS component 414 may be sent to the TTSFE 416 for processing. The TTSFE 416 may include components for performing text normalization, linguistic analysis, and linguistic prosody generation. During text normalization, the TTSFE 416 processes the input text data and generates standard/normalized text data, converting such things as numbers, abbreviations (e.g., Apt., St., etc.), and symbols ($, %, etc.) into the equivalent of written out words.

During linguistic analysis, the TTSFE 416 analyzes language in the normalized text data to generate a sequence of phonetic units corresponding to the text data. This process may be referred to as phonetic transcription. Phonetic units include symbolic representations of sound units to be eventually combined and output by the system 100 as speech. Various sound units may be used for dividing text data for purposes of speech synthesis. The TTS component 414 may process speech based on phonemes (i.e., individual sounds), half-phonemes, di-phones (i.e., the last half of one phoneme coupled with the first half of an adjacent phoneme), bi-phones (i.e., two consecutive phonemes), syllables, words, phrases, sentences, or other units. Each word may be mapped to one or more phonetic units. Such mapping may be performed using a language dictionary stored by the system 100, for example in the TTS storage 420. The linguistic analysis performed by the TTSFE 416 may also identify different grammatical components such as prefixes, suffixes, phrases, punctuation, syntactic boundaries, or the like. Such grammatical components may be used by the TTS component 414 to craft a natural sounding audio waveform output. The language dictionary may also include letter-to-sound rules and other tools that may be used to pronounce previously unidentified words or letter combinations that may be encountered by the TTS component 414. Generally, the more information included in the language dictionary, the higher quality the speech output. The TTS component 414 may use SSML or other tags included in content text data or other text data that indicate a desired pronunciation for content.

Based on the linguistic analysis, the TTSFE 416 may then perform linguistic prosody generation where the phonetic units are annotated with desired prosodic characteristics, also called acoustic features, which indicate how the desired phonetic units are to be pronounced in the eventual output speech. During this stage, the TTSFE 416 may consider and incorporate any prosodic annotations that accompanied the text data input to the TTS component 414. Such acoustic features may include pitch, energy, duration, and the like. Application of acoustic features may be based on prosodic models available to the TTS component 414. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information.

The output of the TTSFE 416, referred to as a symbolic linguistic representation, may include a sequence of phonetic units annotated with prosodic characteristics. This symbolic linguistic representation may be sent to the speech synthesis engine 418, also known as a synthesizer, for conversion into an audio waveform of speech for output to an audio output device and eventually to a user. The speech synthesis engine 418 may be configured to convert the input text data into high-quality natural-sounding speech in an efficient manner. Such high-quality speech may be configured to sound as much like a human speaker as possible, or may be configured to be understandable to a listener without attempts to mimic a precise human voice.

The speech synthesis engine 418 may perform speech synthesis using one or more different methods. In one method of synthesis called unit selection, a unit selection engine 430 matches the symbolic linguistic representation created by the TTSFE 416 against a database of recorded speech, such as a database of a voice corpus (e.g., the TTS voice unit storage 472). The unit selection engine 430 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (e.g., its pitch, energy, etc.), as well as other information, such as where the phonetic unit appears in a word, sentence, or phrase, neighboring phonetic units, etc. Using all the information in the unit database, the unit selection engine 430 may match units to the input text data to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system 100 will be able to construct natural sounding speech.

In another method of synthesis, called parametric synthesis, parameters such as frequency, volume, and noise are varied by a parametric synthesis engine 432, a digital signal processor, or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio data output.

Parametric speech synthesis may be performed as follows. The TTS component 414 may include an acoustic model, or other models, which may convert a symbolic linguistic representation into a synthetic acoustic waveform of the input text data based on audio signal manipulation. The acoustic model includes rules which may be used by the parametric synthesis engine 432 to assign specific audio waveform parameters to input phonetic units and/or prosodic annotations. The rules may be used to calculate a score representing a likelihood that a particular audio output parameter(s) (e.g., frequency, volume, etc.) corresponds to the portion of the input symbolic linguistic representation received from the TTSFE 416.

The parametric synthesis engine 432 may use a number of techniques to match speech to be synthesized with input phonetic units and/or prosodic annotations. One common technique is using HMMs. HMMs may be used to determine probabilities that audio output should match textual input. HMMs may be used to translate from parameters from the linguistic and acoustic space to parameters to be used by a vocoder (i.e., the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text data. Each portion of text data may be represented by multiple potential states corresponding to different known pronunciations of phonemes and their parts (e.g., phoneme identity, stress, accent, position, etc.). An initial determination of a probability of a potential phoneme may be associated with one state. As new text data is processed by the speech synthesis engine 418, the state may change or stay the same, based on processing of the new text data. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, harmonic plus noise (HNM) based vocoders, code-excited linear prediction (CELP) vocoders, GlottHMM vocoders, harmonic/stochastic model (HSM) vocoders, or others.

For example, to create the customized speech output of the system 100, the system 100 may be configured with multiple voice inventories 478 (stored in the TTS voice unit storage 472), where each unit database is configured with a different "voice." Such voice inventories may also be linked to user accounts, discussed below. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual and recorded by the system 100. The TTS training utterances used to train a TTS voice corpus may be different from the training utterances used to train an ASR system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus, the audio data of each customized voice corpus may match a desired speech quality. The customized voice inventory 478 may then be used during runtime to perform unit selection to synthesize speech.

As an alternative to customized voice corpuses or customized parametric "voices," one or more filters may be used to alter traditional TTS output to match a desired speech quality (e.g., whisper, shout, etc.). For example, the TTS component 414 may synthesize speech as normal, but the system 100, either as part of the TTS component 414 or otherwise, may apply a filter to make the synthesized speech take on the desired speech quality. In this manner a traditional TTS output may be altered to take on the desired speech quality.

During runtime the TTS component 414 may receive text data for speech synthesis along with an indicator for a desired speech quality of the output speech. The TTS component 414 may then select a voice matching the speech quality, either for unit selection or parametric synthesis, and synthesize speech using the received text data and speech quality indicator.

Figure 5:
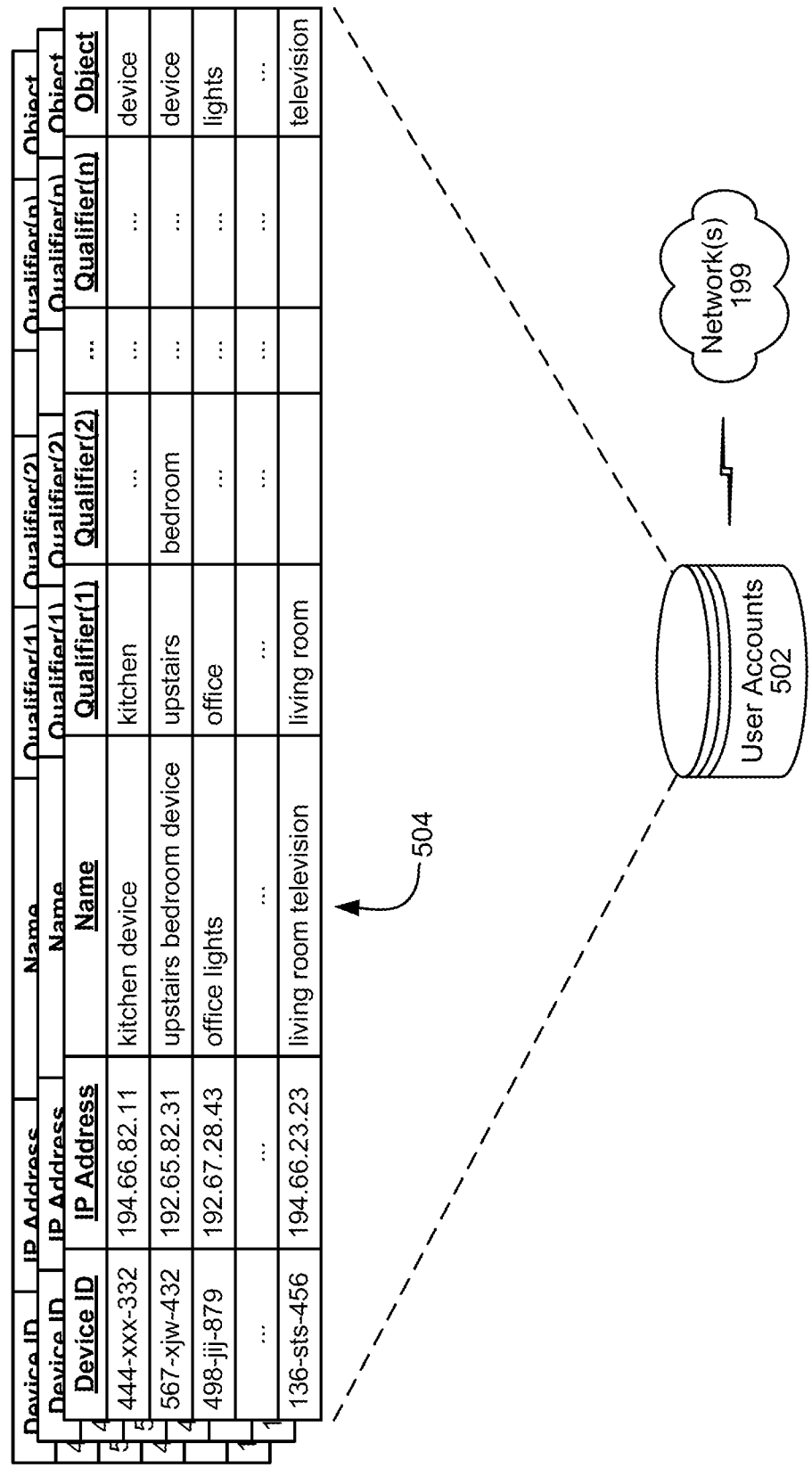
FIG. 5 illustrates data stored and associated with user profiles according to embodiments of the present disclosure.

The server(s) 120 may also include data regarding user accounts, shown by the user profile storage 502 illustrated in FIG. 5. The user profile storage 502 may be located proximate to server(s) 120, or may otherwise be in communication with various components, for example over network 199. The user profile storage 502 may include a variety of information related to individual users, households, accounts, etc. that interact with the system 100. For illustration, as shown in FIG. 5, the user profile storage 502 may include data regarding the devices associated with particular individual user accounts 504. In an example, the user profile storage 502 is a cloud-based storage. Such data may include device identifier (ID) and internet protocol (IP) address information for different devices as well as names by which the devices may be referred to by a user. Further qualifiers describing the devices may also be listed along with a description of the type of object of the device. For example, user preferences regarding commands can be stored by the server(s) 120. Such user preferences can be used by the server(s) 120 to determine commands associated with physical interactions of a device as described herein. The user profile may also include information about user defaults or other preferred settings or information that may be used to execute a command (be it a single input or multiple input command). Each user profile may include information corresponding to one or more applications or content sources enabled by a particular user and default information for each activated application/content source (e.g. "MyDoctor"). Moreover, each user profile may link different devices to a single user, and may contain information regarding a location of each device is (e.g., living room, office, etc.).

Figure 6:
FIG. 6 illustrates a data framework that can be used to import content.

FIG. 6 illustrates a data framework that can be pre-established for a system to use with content sources to ease the importing and integration of content with a speech-controlled system. A content source may provide the speech processing system with text data corresponding to one or more portions of content (e.g., one or more articles, etc.). More than one portion of content may grouped into a library of content and a content source may provide multiple libraries of content. Metadata tags (i.e., [Content Text Data 1 Start], [Content Text Data 1 Stop], etc.) may delineate respective portions of content text data. Metadata data tags (i.e., [Section Break]) may indicate start and stop locations of sections of respective content text data. The text data may also be tagged with [SSML] tags indicating how certain words should be pronounced in TTS speech. The metadata tags may be line specific, word specific, or the like. The text data may additionally be tagged to indicate the content source, as well as tagged to indicate topics that, when spoken by a user, trigger selection of respective content text data.

Upon receiving text data from a content source, the system may associate the tagged section breaks, content text data starts/stops with pre-established executable commands/ intents (e.g., "skip to next section", "skip to next article", etc.) so the content source does not need to create such associations. This results in text data and associated metadata provided by a content source being linked/associated to pre-established NLU commands/intents of the speech-processing system.

Figure 7:
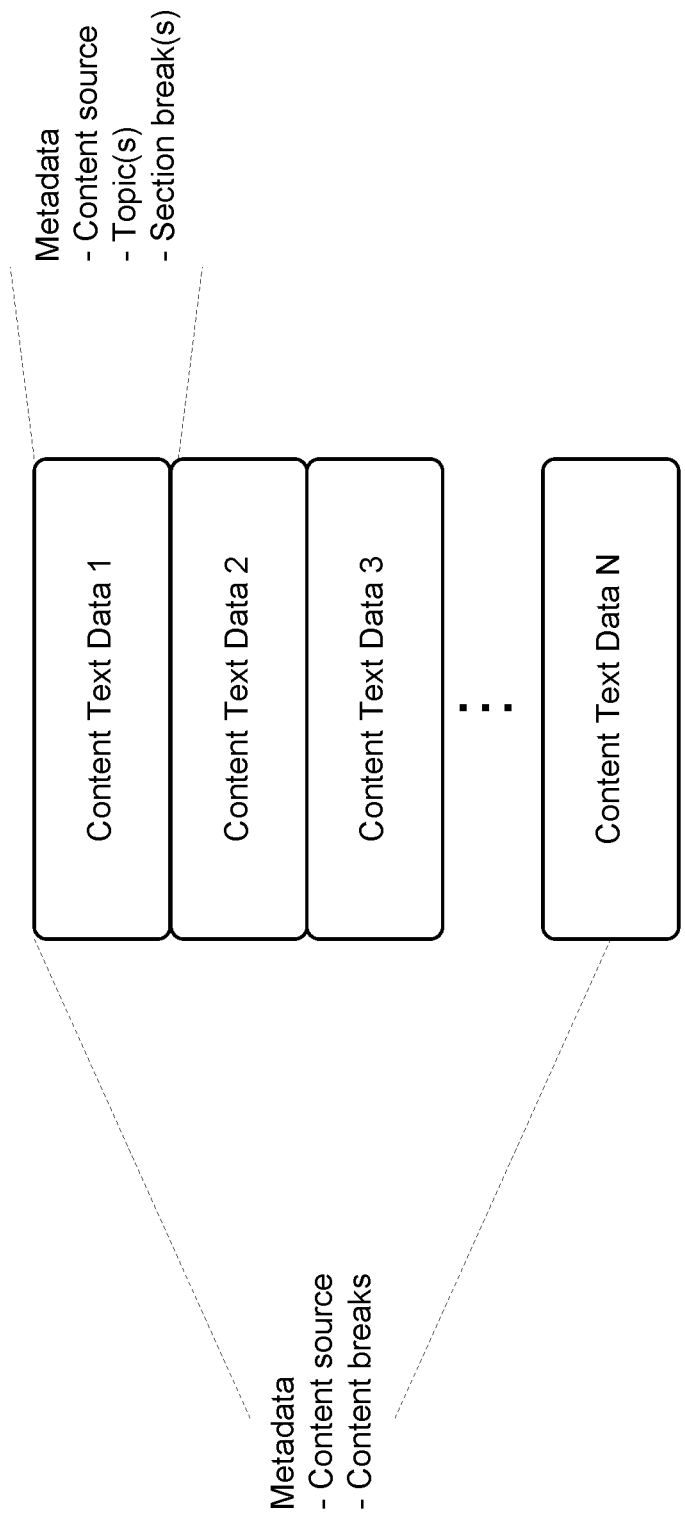
FIG. 7 illustrates received content text data and associated metadata according to embodiments of the present disclosure.

The server(s) 120 may receive text data specific to a single portion of content (e.g., article) in one instance. Alternatively, the server(s) 120 may receive text data specific to a library or group of content (e.g., multiple articles) in one instance. FIG. 7 illustrates received content text data and associated metadata. The content text data may not include content break delineations, section break delineations, etc. The content text data may simply be lines of content text, and the metadata may wholly include content break data, section break data, etc. The format of the content text data may be informed by the metadata accompanying the content text data, business rules, etc. If text data specific to multiple portions of content is received, the metadata associated with all of the portions of content may include content source identifying information (e.g., indicating a content source from which the text data was received), as well as content breaks indicating the start and end points of portions of content in the received library.

Text data specific to a single portion of content may be associated with metadata including content source identifying information, one or more topic that may be used to recall the specific content text data, and one or more section breaks indicating the start and end points of sections of a specific portion of content.

Upon receiving content text data from an application server 125, the server(s) 120 may associate the received content and metadata in a specific format. FIG. 8 illustrates stored and associated content data and metadata for easy recall in response to receiving a spoken command. As shown in FIG. 8, content items may be received from multiple content sources such as, for example, content source X and content source Y. Each content source may be associated with a content source title (e.g., "MyDoctor" or "SuperRecipes") so a user may invoke the content source where desired by speaking the name which will then be recognized in ASR/NLU processing as referring to the particular content source. Each content source may also have a number of content items associated with each source. For example, content source X has three content items, each having its own section of content text data (e.g., content text data X-1, content text data X-2, and content text data X-3). Each content item may be associated with a tag useable by the NLU system (e.g., <content item>) which identifies the text data as corresponding to a content item.

Each content item may correspond to one or more topic labels which may be used to identify the content items by a user when speaking a command to receive the content item. For example, content text data X-1 is associated with topic X-1 such that if a user speaks the name of the topic (e.g., "play topic X-1") the system recognizes the topic X-1 as corresponding to content text data X-1 and can return the content text data X-1 to the user. Each topic may be associated with a tag useable by the NLU system (e.g., <topic>) which identifies the text of the topic name as corresponding to a topic. A single content item may also be associated with multiple topics (e.g., as illustrated in FIG. 8, content text data X-2 is associated both with topic X-2 and topic X-3). This allows a single content item to be retrieved using different topic names. For example, an article on acne may be associated with one topic name of "acne" and another of "pimples."

Depending on system configuration the same topic description may be used for different content items across content sources. For example, topic text "cookies" may refer to an article about chocolate chip cookies for the content source "MyBaking" but may refer to an article about data stored on a computer for the content source "MyITSupport." Thus, if a command is received asking for the system to return information about "cookies," the NLU module may process information about the content source (e.g., "ask my baking about cookies") to further determine which content item corresponds to the topic text.

The data may be stored in a format similar or identical to how a spoken command may be spoken. For example, the spoken command framework discussed herein may correspond to "<intent><content source> about <topic>". As such, the server(s) 120 may store the content source data as associated with topic data, since those are portions of the spoken command framework. The server(s) 120 may also associate topic data with content text data to which it relates. Therefore, if a user says "ask my doctor about acne", the server(s) 120 may determine the content source of "doctor", determine the topic "acne" that is associated with the content source "doctor", and therefrom determine content text data associated with the topic.

Figure 9:
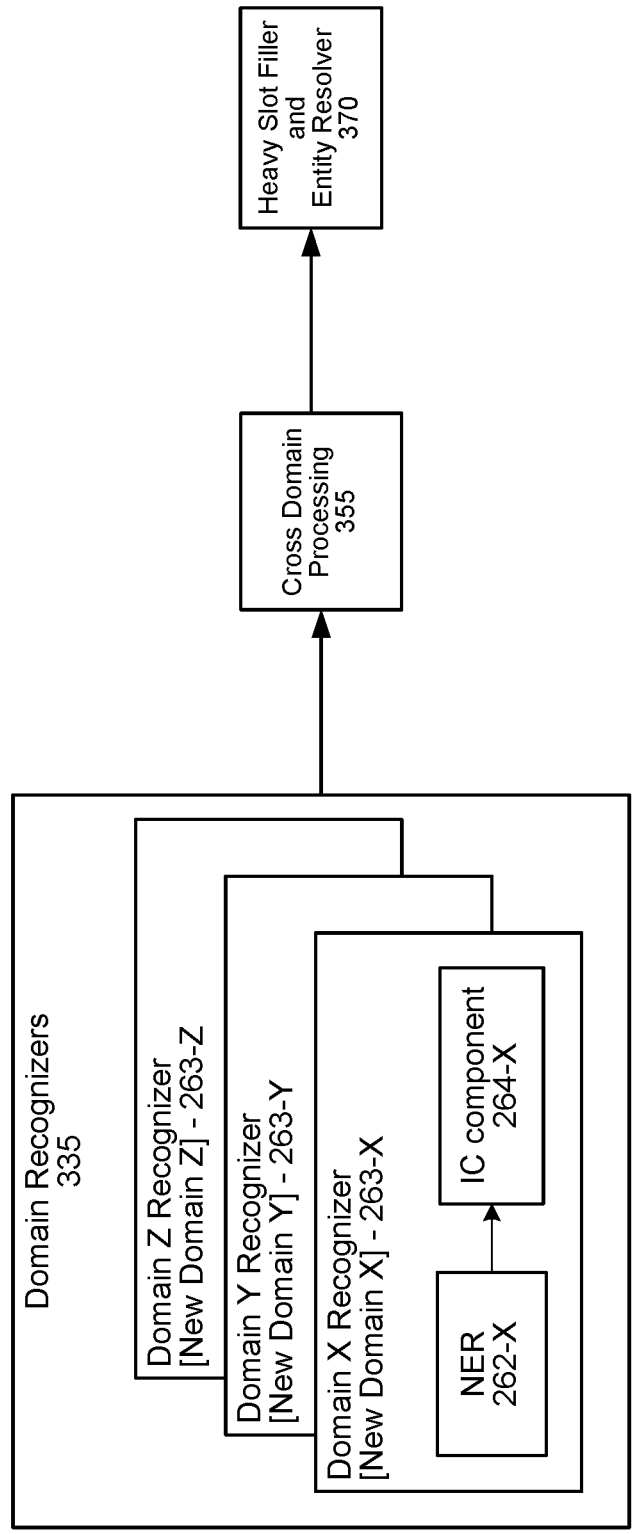
FIG. 9 illustrates the training of new domains specific to content source text data.

Once the speech processing system has content text data from a specific content source, the speech processing system can train particular components to recognize incoming commands that wish to receive or operate on the new incoming content. For example, the system may establish new domains specific to the content text data. This is illustrated in FIG. 9. In particular, the speech processing system can train recognizers 263, NERs 262, and IC components 264, as well as cross domain processing components 355 and heavy slot filler and entity resolvers 370 with respect to particular content text data/content sources. For example, for a new content source X, the system may create a new domain X and train an NER 262-X and/or IC component 264-X that are configured to process incoming text (such as post ASR text) to recognize text such as content source name, topic label name, intent text, etc. The configured components may recognize such text and associate them with tags corresponding to the established framework (e.g., <intent>, <topic>, <content source>, or the like).

As illustrated in FIG. 10, respective domain-specific IC components 264 may be configured to recognize a content source's label text (e.g., the name of a content source for NLU recognition purposes). For example, an IC component 264-X associated with a domain X may be trained to recognize the content source X label text while an IC component 264-Y associated with a domain Y may be trained to recognize the content source Y label text. Further, a content source's label text may be associated with a general IC component, such as 264 which may be used with multiple domains. The IC components associated with specific domains and the general IC component 264 may be trained using metadata. For example, metadata associated with the domain X may be used to train the IC component 264-X to properly recognize content source X label text, and metadata associated with the domain Y may be used to train the IC component 264-Y to properly recognize content source Y label text.

As illustrated in FIG. 11, a content source's topic label text may be may be used to retain an NER component(s) associated with the content source. For example, an NER component 262-X associated with a domain X may be trained to recognize the label text for topics associated with content source X (e.g., topic label text X-1 through X-4) while an NER component 262-Y associated with a domain Y may be trained to recognize the label text for topics associated with content source Y (e.g., topic label text Y-1 and/or Y-6). Further, one or more content source's topic label text may be used to retain other NLU components, for example a generalized heavy slot filler and entity resolver 370 that can determine tags and other NLU data to properly link text data to NLU data corresponding to the new content source(s).

For example, the framework described herein may be used by a book publisher to efficiently incorporate large amounts of book text data into a speech processing system that would allow a user to verbally search and obtain book content. Moreover, the framework may be used to allow a user to verbally search a news feed, such as one provided on a blog or social media website. Thus, it should be appreciated that a user may interact with various types of content from various sources using the same commands (e.g., skip, next section, etc.).

Content text data can be pushed to the speech processing system by the content source. Alternatively or in addition, content text data can be pulled by the speech processing system. The speech processing system may be configured to pull data from a content source on a periodic basis (e.g., hourly, daily, weekly, and the like).

FIGS. 12A through 12C illustrate creating a multi-portion spoken command framework and executing a spoken command. The server(s) 120 receives (1202) content text data and metadata from an application server(s) 125. The server(s) 120 determines (1204) application server identifying information in the metadata. The server(s) 120 also determines (1206) topic information in the metadata. The server(s) 120 associates (1208) each portion of topic information with the application server identifying information. The server(s) 120 also associates (1210) portions of content with respective topics. For example, if a portion of content may be associated with a single topic, or a portion of content may be associated with multiple topics.

The speech-controlled device 110 captures (1212) input audio corresponding to a spoken utterance, and sends (1214) input audio data corresponding thereto to the server(s) 120. The server(s) 120 performs (1216) ASR on the input audio data to create utterance text data. The server(s) 120 performs (1218) NLU on the utterance text data to determine NLU results, which may include a content source and a topic of a command in the spoken utterance. The server(s) 120 may determine the content source and the topic from tags indicating such in the NLU results. The server(s) 120 may determine (1222) content text data associated with the content source and the topic. Alternatively, the server(s) 120 may determine content text data associated with multiple content sources and the topic. The server(s) 120 may then determine a content text data to provide to the user based on a respective credibility associated with each content source, user preferences, or the like. Moreover, the server(s) 120 may be configured to determine content text data using contemporary information. For example, if a user says "Tell me about viruses in south Florida," the server(s) 120 may access sources (e.g., news sources) to determine recent viruses, and may parse the spoken query as stating "Tell me about the Zika virus." The server(s) 120 may perform (1224) TTS processing on the content text data to create output audio data. Such TTS processing may be performed using SSML data present in the content text data. The server(s) 120 sends (1226) the output audio data to the speech-controlled device 110 (or another device associated with a profile of the user that spoke the utterance), and the speech-controlled device 110 outputs (1228) the audio.

In some situations, users of a device may request information about the device. For example, a user of a speech-controlled vehicle may state "how do I replace the battery". As such, the system of the present disclosure may ingest user manuals and other content specific to types of devices (e.g., vehicles, appliances such as refrigerators, washers, dryers, as well as other speech-controlled devices). The system may create various associations between the ingested content and pre-stored NLU frameworks/intents that enables the system to thereafter isolate content relevant to a device being interacted with by a user.

FIGS. 13A through 13C illustrate the creation of a multi-portion NLU framework/intent specific to types of devices, as well as the execution of a spoken command specific to a type of device. The server(s) 120 receives (1202) content text data and metadata from an application server/content source 125. The content text data and metadata may be specific to a type of device. For example, the content text data may correspond to a user manual for a type of device.

The server(s) 120 determines (1502) the type of device to which the content text data and metadata relate. The server(s) 120 selects (1504) a pre-stored NLU intent corresponding to a desire to receive content about a type of device. The server(s) 120 may store (1506) an association between the type of device (to which the content text data and metadata relate) and a tag/slot of the pre-stored NLU intent. The server(s) 120 may also determine (1206) topic information in the metadata, and store (1508) an association between the topic and a tag of the pre-stored NLU intent.

Sometime after the content text data and metadata are associated with tags of the pre-stored NLU intent, a speech-controlled device 110 may capture (1212) input audio corresponding to a spoken utterance, and send (1214) input audio data corresponding thereto to the server(s) 120. The server(s) 120 performs (1310) speech processing (e.g., ASR and NLU) on the input audio data to obtain text data. Based on the text data, the server(s) 120 determines (1312) the spoken utterance includes a request for information relevant or specific to the speech-controlled-device 110. The server(s) 120 determines (1514) the speech-controlled device 110 corresponds to the type of device. The server(s) 120 also determines (1316) the spoken utterance includes the topic. The server(s) 120 determines (1318) the content text data based on performing NLU using the pre-stored intent to receive content about a type of device. Specifically, the server(s) 120 determines (1318) the content text data by performing NLU with respect to the determined type of device being associated with the first tag of the pre-stored intent and the determined topic being associated with the second tag of the pre-stored intent.

The server(s) 120 may perform (1224) TTS processing on the content text data to create output audio data. The server(s) 120 may send (1226) the output audio data to the speech-controlled device 110 (or another device associated with a profile of the user that spoke the utterance), and the speech-controlled device 110 outputs (1228) the audio.

In other situations, users of a device may request content about the device, and the system may obtain such content in response thereto based on traditional NLU processing. The system may then determine a type of device to which the content relates, and associate the content with various tags of a pre-stored NLU intent to receive content about a type of device. This allows the system to process subsequent requests for content about the device using the pre-stored NLU intent rather than traditional NLU processing.

FIGS. 14A through 14C illustrate the execution of a spoken command specific to a type of device and the creation thereafter of a multi-portion spoken command framework specific to the type of device. A speech-controlled device 110 captures (1212) input audio corresponding to a spoken utterance, and sends (1214) input audio data corresponding thereto to the server(s) 120.

The server(s) 120 performs (1310) speech processing (e.g., ASR and NLU) on the input audio data to obtain text data. Based on the obtained text data, the server(s) 120 may determine (1312) the spoken utterance includes a request for information specific to the speech-controlled device 110. The server(s) 120 then determines (1602) a content source (e.g., application server 125) associated with the speech-controlled device 110. For example, if the speech-controlled device is a vehicle or household appliance, the content source/application server 125 may be the manufacture of such vehicle or household appliance. The server(s) 120 then sends (1604) a signal to the content source requesting content specific to the speech-controlled device 110.

The server(s) 120 receives (1202) content text data and metadata from the application server/content source 125. The server(s) 120 may perform (1224) TTS processing on the content text data to create output audio data. The server(s) 120 may send (1226) the output audio data to the speech-controlled device 110 (or another device associated with a profile of the user that spoke the utterance), and the speech-controlled device 110 outputs (1228) the audio.

Sometime after receiving the content text data and metadata from the content source, the server(s) 120 may determine (1206) topic information in the metadata, and select (1504) a pre-stored NLU intent corresponding to a desire to receive content about a type of device. The server(s) 120 may then store (1506) an association between the type of device (i.e., the type of speech-controlled device 110) and a tag/slot of the pre-stored NLU intent, as well as store (1508) an association between the topic and another tag of the pre-stored NLU intent.

As described with respect to FIGS. 13A through 13C and FIGS. 14A through 14C, ingested content is implemented with pre-stored NLU intents on a content topic level. It should also be appreciated that ingested content may be implemented with pre-stored NLU intents on a content sub-topic level. For example, the system may ingest content corresponding to a user manual of a vehicle. The user manual may include headings such as battery replacement, oil replacement, etc. The system may treat the headings of the ingested content as sub-topics. Thus, if a user requests information on battery replacement, the system is able to identify the content relating to battery replacement, and output such, rather than simply identifying the user manual, and outputting the entirety of the user manual. The server(s) 120 may associate determined sub-topics with a tag of the pre-stored NLU intent to receive content about a type of device.

Information corresponding to the type of device of the speech-controlled device 110 may be stored in a user profile. For example, during a setup process, information of the speech-controlled device 110 may be associated with a user profile associated with a user of the speech-controlled device 110. The speech-controlled device identifying information may be received by the server(s) 120 from the speech-controlled device 110, and the server(s) 120 may associate the speech-controlled device identifying information to the user profile. Thus, it should be appreciated that determining the type of device from which the spoken utterance is received may be based on the user profile and device identifying information therein. For example, when the server(s) 120 receives audio data corresponding to a spoken utterance, the server(s) 120 may perform recognition processing on the audio data to determine a user that spoke the utterance. The server(s) 120 may then determine a profile associated with the user, use the identity of the speech-controlled device 110 as an index, and thereby determine speech-controlled device type information within the user profile. The speech-controlled device identifying information may be a unique identifier such as a serial number. In that instance, the system 100 may use the serial number to determine the type of device. In some instances, the speech-controlled device identifying information may be sent to the server(s) in conjunction with audio data corresponding to a user query/command.

Rather than store associations between portions of stored content and NLU tags, the system may be configured to store an association between an NLU tag and a source of content. For example, the system may be configured to store an association between an NLU tag and a device storing or having access to content specific to a user device, such as a user manual. Thus, if a user requests user manual content for a user device, NLU processing may cause the system to access the content from the device storing such.

Figure 16:
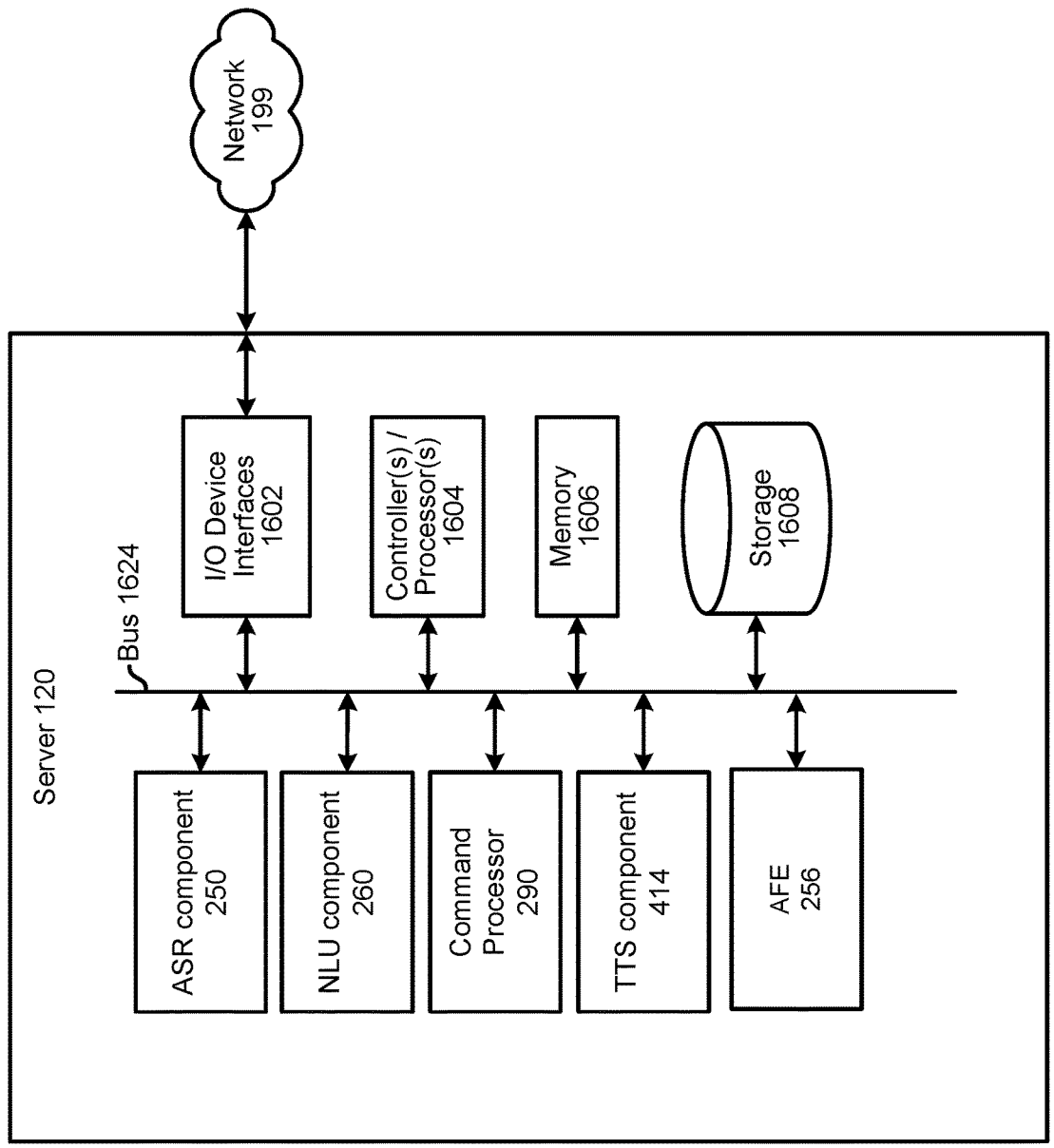
FIG. 16 is a block diagram conceptually illustrating example components of a server according to embodiments of the present disclosure.

FIG. 15 is a block diagram conceptually illustrating a user device 110 (e.g., the speech-controlled device 110 described herein) that may be used with the described system. FIG. 16 is a block diagram conceptually illustrating example components of a remote device, such as the server 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1504/1604), that may each include a central processing unit (CPU) for processing data and computer-readable instructions, and a memory (1506/1606) for storing data and instructions of the respective device. The memories (1506/1606) may individually include volatile random access memory (RAM), non-volatile read only memory (ROM), non-volatile magnetoresistive (MRAM) and/or other types of memory. Each device (110/120) may also include a data storage component (1508/1608), for storing data and controller/processor-executable instructions. Each data storage component may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1502/1602).

Computer instructions for operating each device (110/120) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device (110/120) includes input/output device interfaces (1502/1602). A variety of components may be connected through the input/output device interfaces (1502/1602), as will be discussed further below. Additionally, each device (110/120) may include an address/data bus (1524/1624) for conveying data among components of the respective device. Each component within a device (110/120) may also be directly connected to other components in addition to (or instead of) being connected to other components across the bus (1524/1624).

Referring to FIG. 15, the device 110 may include input/output device interfaces 1502 that connect to a variety of components such as an audio output component such as a speaker 101, a wired headset or a wireless headset (not illustrated), or other component capable of outputting audio. The device 110 may also include an audio capture component. The audio capture component may be, for example, a microphone 103 or array of microphones, a wired headset or a wireless headset (not illustrated), etc. The microphone 103 may be configured to capture audio. If an array of microphones is included, approximate distance to a sound's point of origin may be determined by acoustic localization based on time and amplitude differences between sounds captured by different microphones of the array. The device 110 may additionally include an image or video capture component, such as the camera 115. The camera 115 may be configured to capture data used to perform facial recognition, and ultimately user recognition.

For example, via antenna(s) 1514, the input/output device interfaces 1502 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

Referring to FIG. 16, the server 120 may include a user recognition component 1202 configured to perform user recognition as described herein. The server 120 may also be configured with the TTS component 414, AFE 256, or other components as described herein.

The device 110 and/or the server 120 may include an ASR component 250. The ASR component 250 in the device 110 may be of limited or extended capabilities. The ASR component 250 may include the language models 254 stored in ASR model storage component 252. If limited speech recognition is included, the ASR component 250 may be configured to identify a limited number of words, whereas extended speech recognition may be configured to recognize a much larger range of words.

The device 110 and/or the server 120 may include a limited or extended NLU component 260. The NLU component 260 in the device 110 may be of limited or extended capabilities. The NLU component 260 may comprise the name entity recognition component 262, the intent classification component 264, and/or other components. The NLU component 260 may also include a stored knowledge base and/or entity library, or those storages may be separately located.

The device 110 and/or the server 120 may also include the command processor 290 configured to execute commands/functions associated with a spoken utterance as described herein.

As noted above, multiple devices may be employed in a single speech processing system. In such a multi-device system, each of the devices may include different components for performing different aspects of the speech processing. The multiple devices may include overlapping components. The components of the device 110 and the server 120, as illustrated in FIGS. 10 and 11, are exemplary, and may be located as a stand-alone device or may be included, in whole or in part, as a component of a larger device or system.

As illustrated in FIG. 17, multiple devices (120, 110*a*-110*g*) may contain components of the system 100 and the devices may be connected over a network 199. The network 199 may include a local or private network or may include a wide network such as the Internet. Devices may be connected to the network 199 through either wired or wireless connections. For example, the speech-controlled device 110*a*, a smart phone 110*b*, a smart watch 110*c*, a tablet computer 110*d*, 110*e*, a refrigerator 110*f*, a washer/dryer 110*g*, or other unillustrated appliance may be connected to the network 199 through a wireless service provider, over a WiFi or cellular network connection, or the like. Other devices are included as network-connected support devices, such as the server 120 or others. The support devices may connect to the network 199 through a wired connection or wireless connection. Networked devices may capture audio using one-or-more built-in or connected microphones 103 or audio capture devices, with processing performed by ASR, NLU, or other components of the same device or another device connected via the network 199, such as the ASR component 250, the NLU component 260, etc. of one or more servers 120.

The concepts disclosed herein may be applied within a number of different devices and computer systems, including, for example, general-purpose computing systems, speech processing systems, object recognition (e.g., facial recognition) systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, speech processing, object recognition (e.g., facial recognition), and user recognition should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the components and engines may be implemented as in firmware or hardware, such as the AFE 256, which comprises, among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A system, comprising:
   at least one processor; and
   at least one memory including instructions that, when executed by the at least one processor, cause the system to:
   receive, from a first device, first input audio data representing a first utterance;
   process the first input audio data to determine the first utterance requests information;
   identify a second device storing the information;
   send, to the second device, a request for the information;
   in response to sending the request for information to the second device, receive, from the second device, first data corresponding to the information requested by the first utterance;
   in response to sending the request for information to the second device, receive, from the second device, metadata associated with the first data;
   cause the first device to output the information requested by the first utterance;
   determine a first portion of the metadata identifying the second device;
   determine, using the metadata, a first topic of the information;
   associate, in a storage, the first portion of the metadata, the first topic, and the first data; and
   generate natural language understanding (NLU) component data using the first portion of the metadata and the first topic, the NLU component data being usable by at least one NLU component to identify the first data in the storage in response to at least one future utterance requesting the information.

2. The system of claim 1, wherein the at least one memory further includes instructions that, when executed by the at least one processor, further cause the system to:
   after generating the NLU component data, receive second input audio data representing a second utterance;
   using the NLU component data, determine the second utterance indicates the second device and the first topic; and
   in response to determining the second utterance indicates the second device and the first topic, determine the first data in the storage.

3. The system of claim 1, wherein the at least one memory further includes instructions that, when executed by the at least one processor, further cause the system to:
   determine a second portion of the metadata corresponding to a start point of a first section of the first data;
   determine a third portion of the metadata corresponding to an end point of the first section;
   generate the NLU component data further using the second portion and the third portion; and
   cause the first device to output the information by sending the first section to the first device for output.

4. The system of claim 3, wherein the at least one memory further includes instructions that, when executed by the at least one processor, further cause the system to:
   determine a fourth portion of the metadata corresponding to a start point of a second section of the first output data;
   determine a fifth portion of the metadata corresponding to an end point of the second section;
   generate the NLU component data further using the fourth portion and the fifth portion;
   after generating the NLU component data, receive, from the first device, second input audio data representing a second utterance;
   using the NLU component data, determine the second utterance requests a next section be output; and
   send the second section to the first device for output.

5. The system of claim 1, wherein the at least one memory further includes instructions that, when executed by the at least one processor, further cause the system to:
   determine a second portion of the metadata indicating a start of a first portion of the first data corresponding to the first topic;
   determine a third portion of the metadata indicating an end of the first portion of the first data; and
   determine a fourth portion of the metadata indicating a start of a second portion of the first data corresponding to a second topic, the second portion of the first data being subsequent to the first portion of the first data.

6. The system of claim 1, wherein the at least one memory further includes instructions that, when executed by the at least one processor, further cause the system to:
   process the first input audio data to determine the first utterance requests information about the first device.

7. The system of claim 1, wherein the at least one memory further includes instructions that, when executed by the at least one processor, further cause the system to:
   determine a user input framework including an intent portion, a data source portion, and a topic portion; and
   generate the NLU component data by:
   associating the first portion of the metadata with the data source portion of the user input framework; and
   associating the first topic with the topic portion of the user input framework.

8. The system of claim 1, wherein the at least one memory further includes instructions that, when executed by the at least one processor, further cause the system to:
   generate the NLU component data by associating the first portion and the first topic with an intent indicator.

9. The system of claim 1, wherein the at least one memory further includes instructions that, when executed by the at least one processor, further cause the system to:
   generate intent classification (IC) data for performing IC processing of the at least one future utterance.

10. The system of claim 1, wherein the at least one memory further includes instructions that, when executed by the at least one processor, further cause the system to:

generate named entity recognition (NER) data for performing NER processing of the at least one future utterance.

11. A computer-implemented method, comprising:
receiving, from a first device, first input audio data representing a first utterance;
processing the first input audio data to determine the first utterance requests information;
identifying a second device storing the information;
sending, to the second device, a request for the information;
in response to sending the request for information to the second device, receiving, from the second device, first data corresponding to the information requested by the first utterance;
in response to sending the request for information to the second device, receiving, from the second device, metadata associated with the first data;
causing the first device to output the information requested by the first utterance;
determining a first portion of the metadata identifying the second device;
determining, using the metadata, a first topic of the information;
associating, in a storage, the first portion of the metadata, the first topic, and the first data; and
generating natural language understanding (NLU) component data using the first portion of the metadata and the first topic, the NLU component data being usable by at least one NLU component to identify the first data in the storage in response to at least one future utterance requesting the information.

12. The computer-implemented method of claim 11, further comprising:
after generating the NLU component data, receiving second input audio data representing a second utterance;
using the NLU component data, determine the second utterance indicates the second device and the first topic; and
in response to determining the second utterance indicates the second device and the first topic, determining the first data in response in the storage.

13. The computer-implemented method of claim 11, further comprising:
determining a second portion of the metadata corresponding to a start point of a first section of the first data;
determining a third portion of the metadata corresponding to an end point of the first section;
generating the NLU component data further using the second portion and the third portion; and
causing the first device to output the information by sending the first section to the first device for output.

14. The computer-implemented method of claim 13, further comprising:
determining a fourth portion of the metadata corresponding to a start point of a second section of the first data;
determining a fifth portion of the metadata corresponding to an end point of the second section;
generating the NLU component data further using the fourth portion and the fifth portion;
after generating the NLU component data, receiving, from the first device, second input audio data representing a second utterance;
using the NLU component data, determining the second utterance requests a next section be output; and
sending the second section to the first device for output.

15. The computer-implemented method of claim 11, further comprising:
determining a second portion of the metadata indicating a start of a first portion of the first data corresponding to the first topic;
determining a third portion of the metadata indicating an end of the first portion of the first data; and
determining a fourth portion of the metadata indicating a start of a second portion of the first data corresponding to a second topic, the second portion of the first data being subsequent to the first portion of the first data.

16. The computer-implemented method of claim 11, further comprising:
processing the first input audio data to determine the first utterance requests information about the first device.

17. The computer-implemented method of claim 11, further comprising:
determining a user input framework including an intent portion, a data source portion, and a topic portion; and
generating the NLU component data by:
associating the first portion of the metadata with the data source portion of the user input framework; and
associating the first topic with the topic portion of the user input framework.

18. The computer-implemented method of claim 11, further comprising:
generating the NLU component data by associating the first portion and the first topic with an intent indicator.

19. The computer-implemented method of claim 11, further comprising:
generating intent classification (IC) data for performing IC processing of the at least one future utterance.

20. The computer-implemented method of claim 11, further comprising:
generating named entity recognition (NER) data for performing NER processing of the at least one future utterance.

* * * * *